United States Patent
Yamamoto et al.

(10) Patent No.: US 12,106,088 B2
(45) Date of Patent: Oct. 1, 2024

(54) INFORMATION PROCESSING SYSTEM, INFORMATION PROCESSING DEVICE, INFORMATION PROCESSING METHOD, AND RECORDING MEDIUM

(71) Applicant: TOYOTA JIDOSHA KABUSHIKI KAISHA, Toyota (JP)

(72) Inventors: Masafumi Yamamoto, Nagakute (JP); Atsushi Tabata, Okazaki (JP); Koichi Okuda, Toyota (JP); Yuki Makino, Aichi-gun (JP); Yoshito Sekiguchi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 183 days.

(21) Appl. No.: 17/818,157

(22) Filed: Aug. 8, 2022

(65) Prior Publication Data
US 2023/0082123 A1 Mar. 16, 2023

(30) Foreign Application Priority Data
Sep. 16, 2021 (JP) .................. 2021-151212

(51) Int. Cl.
G06F 9/44 (2018.01)
G06F 8/65 (2018.01)

(52) U.S. Cl.
CPC ..................... G06F 8/65 (2013.01)

(58) Field of Classification Search
None
See application file for complete search history.

(56) References Cited

U.S. PATENT DOCUMENTS

| 2013/0253782 | A1* | 9/2013 | Saltsman | G01M 17/007 703/8 |
| 2018/0113728 | A1* | 4/2018 | Musani | G06F 11/362 |
| 2021/0064507 | A1* | 3/2021 | Chakra | G06F 11/3409 |
| 2021/0070286 | A1* | 3/2021 | Green | G05D 1/0246 |
| 2021/0141634 | A1* | 5/2021 | Jeong | G06F 8/658 |
| 2021/0406721 | A1* | 12/2021 | Pathak | G06N 5/04 |
| 2022/0138068 | A1* | 5/2022 | Dal Zotto | G06F 11/302 714/47.1 |

FOREIGN PATENT DOCUMENTS

JP 2003-034200 A 2/2003
JP 2017-59210 A 3/2017

* cited by examiner

*Primary Examiner* — Wei Y Zhen
*Assistant Examiner* — Lanny N Ung
(74) *Attorney, Agent, or Firm* — Oblon, McClelland, Maier & Neustadt, L.L.P.

(57) ABSTRACT

A software update system includes: a vehicle data acquiring unit configured to acquire data on a state of a vehicle including data of a predetermined performance of the vehicle; an effect predicting unit configured to predict an effect on the predetermined performance which is obtained when update data of software used in the vehicle for improvement of the predetermined performance is applied to the vehicle based on the data acquired by the vehicle data acquiring unit; and a delivery unit configured to deliver the update data to the vehicle when the effect predicted by the effect predicting unit satisfies a predetermined reference and to withhold delivery of the update data to the vehicle when the effect predicted by the effect predicting unit does not satisfy the predetermined reference.

11 Claims, 10 Drawing Sheets

INFORMATION PROCESSING SYSTEM, INFORMATION PROCESSING DEVICE, INFORMATION PROCESSING METHOD, AND RECORDING MEDIUM

CROSS-REFERENCE TO RELATED APPLICATION

This application claims priority to Japanese Patent Application No. 2021-151212 filed on Sep. 16, 2021, incorporated herein by reference in its entirety.

BACKGROUND

1. Technical Field

The present disclosure relates to an information processing system and the like.

2. Description of Related Art

A technique of transmitting update data of software (for example, update data such as a program or parameters used in the program) used in a vehicle from an external device to the vehicle and causing the vehicle to update the software is known (see Japanese Unexamined Patent Application Publication No. 2003-34200 (JP 2003-34200 A)).

In JP 2003-34200 A, the operation of the vehicle before and after software update is evaluated using an evaluation simulator, and the software is updated after it has been ascertained that the function of the vehicle has been corrected in a desirable direction through the updating of software.

SUMMARY

However, vehicles to which update data is to be applied may differ in characteristics, operating conditions, and the like. Accordingly, there is a possibility that an effect which is actually achieved by software update will be relatively small depending on the characteristics, the operating conditions, and the like of the vehicles. As a result, there is a possibility that software may be uselessly updated when an expected effect cannot be achieved.

Therefore, the present disclosure provides a technique that enables more appropriately updating software which is used in a vehicle.

According to an embodiment of the present disclosure, there is provided an information processing system including: an acquisition unit configured to acquire data of a vehicle including data of a predetermined performance of the vehicle; a prediction unit configured to predict an effect on the predetermined performance which is obtained when update data of software used in the vehicle for improvement of the predetermined performance is applied to the vehicle based on the data acquired by the acquisition unit; and a delivery unit configured to deliver the update data to the vehicle when the effect predicted by the prediction unit satisfies a predetermined reference and to withhold delivery of the update data to the vehicle when the effect predicted by the prediction unit does not satisfy the predetermined reference.

According to another embodiment of the present disclosure, there is provided an information processing device including: an acquisition unit configured to acquire data of a vehicle including data of a predetermined performance of the vehicle; a prediction unit configured to predict an effect on the predetermined performance which is obtained when update data of software used in the vehicle for improvement of the predetermined performance is applied to the vehicle based on the data acquired by the acquisition unit; and a delivery unit configured to deliver the update data to the vehicle when the effect predicted by the prediction unit satisfies a predetermined reference and to withhold delivery of the update data to the vehicle when the effect predicted by the prediction unit does not satisfy the predetermined reference.

According to another embodiment of the present disclosure, there is provided an information processing method that is performed by an information processing device, the information processing method including: an acquisition step of acquiring data of a vehicle including data of a predetermined performance of the vehicle; a prediction step of predicting an effect on the predetermined performance which is obtained when update data of software used in the vehicle for improvement of the predetermined performance is applied to the vehicle based on the data acquired in the acquisition step; and a delivery step of delivering the update data to the vehicle when the effect predicted in the prediction step satisfies a predetermined reference and withholding delivery of the update data to the vehicle when the effect predicted in the prediction step does not satisfy the predetermined reference.

According to another embodiment of the present disclosure, there is provided a storage medium storing a program causing an information processing device to perform: an acquisition step of acquiring data of a vehicle including data of a predetermined performance of the vehicle; a prediction step of predicting an effect on the predetermined performance which is obtained when update data of software used in the vehicle for improvement of the predetermined performance is applied to the vehicle based on the data acquired in the acquisition step; and a delivery step of delivering the update data to the vehicle when the effect predicted in the prediction step satisfies a predetermined reference and withholding delivery of the update data to the vehicle when the effect predicted in the prediction step does not satisfy the predetermined reference.

According to the embodiment, it is possible to enable more appropriate updating of software which is used in a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment will be described with reference to the accompanying drawings.

Summary of Software Update System

The summary of a software update system 1 according to this embodiment will be described below with reference to FIG. 1.

Figure 1:
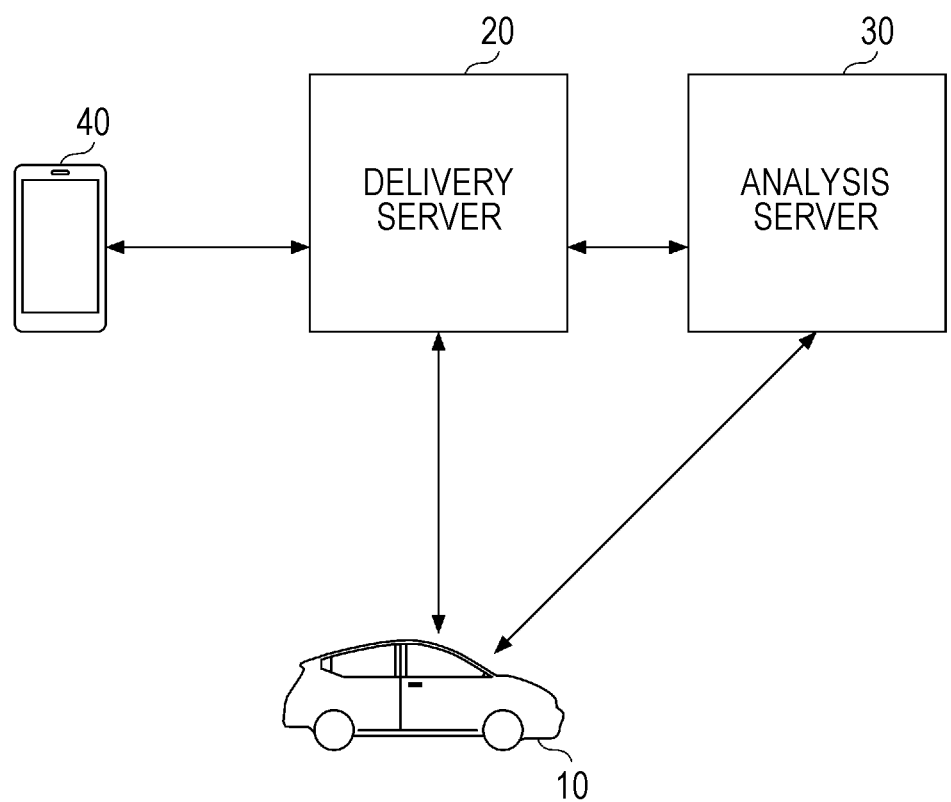
FIG. 1 is a diagram schematically illustrating an example of a software update system.

FIG. 1 is a diagram schematically illustrating an example of the software update system 1.

As illustrated in FIG. 1, the software update system 1 (an example of an information processing system) includes a vehicle 10, a delivery server 20, an analysis server 30, and a user terminal 40.

The software update system 1 transmits update data of software which is used in the vehicle 10 to the vehicle 10 and updates software of the vehicle 10.

Examples of the software of the vehicle 10 include programs that are executed by a computer mounted in the vehicle 10 (an onboard computer) such as a gateway electronic control unit (ECU) 12, an ECU 13, or a central ECU 19 which will be described later. Examples of the software of the vehicle 10 include various types of data such as parameters that are used in processes of the programs that are executed by the onboard computer.

The vehicle 10 is an object of which software is to be updated and travels using power which is transmitted from a predetermined prime mover such as an engine or an electric motor to driving wheels via a drive system including a transmission, a differential, and a drive shaft.

The vehicle 10 has a communication device 11 mounted thereon as will be described later and is communicatively connected to an external device such as the delivery server 20 or the analysis server 30 via a predetermined communication line. Accordingly, the vehicle 10 can transmit an information signal to the delivery server 20 or the analysis server 30 or receive a control signal or an information signal (for example, update data of software) from the delivery server 20 or the analysis server 30.

The predetermined communication line includes, for example, a wide area network (WAN) such as a mobile communication network with base stations as terminals, a satellite communication network using communication satellites, and the Internet. For example, the predetermined communication line may include a local area network (LAN) of a facility in which the delivery server 20 or the analysis server 30 is installed. For example, the predetermined communication line may include a short-range communication line based on radio communication standards such as WiFi and Bluetooth (registered trademark). In the following description, the same is true of a communication line which is used for communication between the delivery server 20 and the analysis server 30, a communication line which is used for communication between the delivery server 20 and the user terminal 40, and the like.

The number of vehicles 10 included in the software update system 1 may be one or two or more. In the latter, two or more vehicles 10 included in the software update system 1 may be, for example, of the same model or may include two or more models of vehicles 10.

The delivery server 20 delivers various types of data used in a vehicle 10 to the vehicle 10. Specifically, the delivery server 20 delivers update data of software to the vehicle 10.

The delivery server 20 is, for example, an on-premises server or a cloud server that is provided in a monitoring center or the like that comprehensively monitors states or the like of a plurality of vehicles 10. For example, the delivery server 20 may be an edge server that is provided in an area in which a vehicle 10 mainly travels (for example, an area in which the vehicle 10 is legally registered). In this case, a plurality of delivery servers 20 may be provided for all the vehicles 10 included in the software update system 1. In the following description, the same is true of the analysis server 30.

The delivery server 20 is communicatively connected to the vehicles 10 via the predetermined communication line as described above. Accordingly, the delivery server 20 can receive various information signals from the vehicles 10 or transmit various information signals (for example, update data of software), control signals (for example, a software update command), and the like to the vehicles 10.

For example, the analysis server 30 acquires various types of data indicating states of the vehicles 10 (hereinafter referred to as "vehicle data") from the vehicles 10 or an external device associated with the vehicles 10 and performs analysis associated with the vehicles 10. Specifically, the analysis server 30 analyzes an effect on predetermined performance acquired by updating software of a vehicle 10. The vehicle data to be acquired includes data of a predetermined performance which is predicted to be improved by software update. The external device associated with the vehicles 10 includes, for example, a server device in a factory in which manufacturing data of the vehicles 10 is stored. Examples of the manufacturing data of the vehicles 10 include data of manufacturing irregularities of the vehicles 10 such as data of manufacturing irregularities for each component of the vehicles 10 or data of assembling irregularities for each component of the vehicles 10.

The analysis server 30 is communicatively connected to a vehicle 10 via a predetermined communication line as described above. Accordingly, the analysis server 30 can receive various information signals (for example, vehicle data) from the vehicle 10 or transmit various information signals or control signals to the vehicle 10.

The analysis server 30 is communicatively connected to the delivery server 20 or the user terminal 40 via a predetermined communication line. Accordingly, the analysis server 30 can transmit various information signals or control signals to the delivery server 20 or the user terminal 40 or receive various information signals or control signals from the delivery server 20 or the user terminal 40.

The functions of the delivery server 20 and the analysis server 30 may be integrally realized by a single server, for example, the delivery server 20 (an example of an information processing device) or divisionally realized by three or more servers.

The user terminal 40 is a terminal device that is used (carried) by a user of the vehicle 10. The user of the vehicle 10 is, for example, an owner of the vehicle 10 or a family member of the owner of the vehicle 10. The user terminal 40 is a mobile (portable) terminal device such as a smartphone, a tablet terminal, or a laptop personal computer (PC). The user terminal 40 may be, for example, a stationary terminal device such as a desktop PC.

The user terminal 40 is communicatively connected to the delivery server 20 via a predetermined communication line as described above. Accordingly, the user terminal 40 can receive control signals or information signals transmitted from the delivery server 20 and allow the user of the vehicle 10 to understand information included in the signals using a display, a speaker, or the like. The user terminal 40 can transmit control signals or information signals corresponding to input details to the delivery server 20 in response to an input from the user and transmit a user request corresponding to the input details of the user to the delivery server 20.

Hardware Configuration of Software Update System

A hardware configuration of the software update system 1 will be described below with reference to FIGS. 2 and 3 in addition to FIG. 1.

Hardware Configuration of Vehicle

Figure 2:
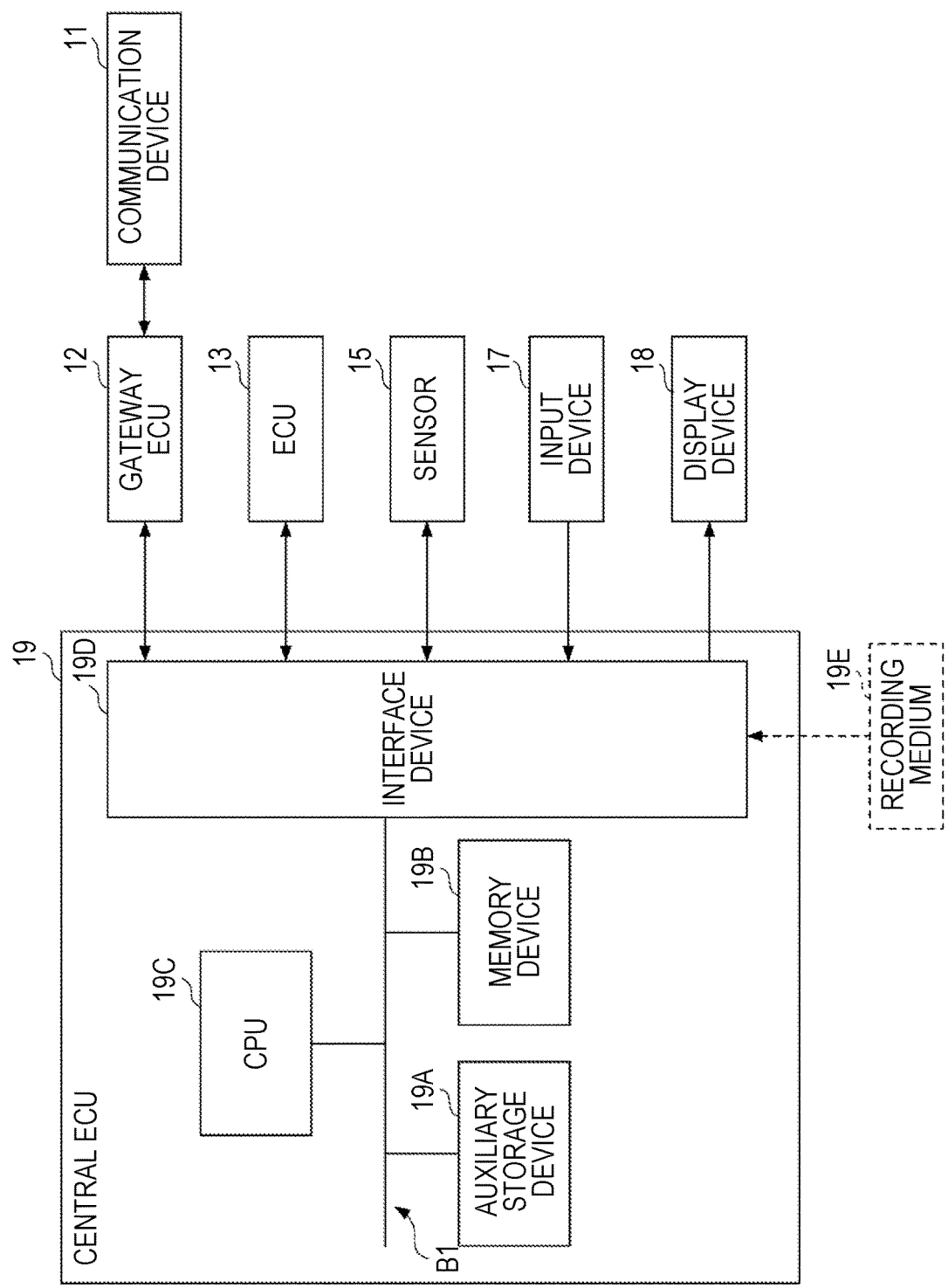
FIG. 2 is a diagram illustrating an example of a hardware configuration of a vehicle.

FIG. 2 is a diagram illustrating an example of the hardware configuration of a vehicle 10.

As illustrated in FIG. 2, the vehicle 10 includes a communication device 11, a gateway ECU 12, an ECU 13, a sensor 15, an input device 17, a display device 18, and a central ECU 19.

The communication device 11 performs communication with the outside of the vehicle 10 via a predetermined communication line. The communication device 11 is, for example, a mobile communication module that is connected to a mobile communication network with base stations as terminals and can perform communication with the outside and may be specifically a data communication module (DCM). The communication device 11 is communicatively connected to the gateway ECU 12, the ECU 13, the central ECU 19, or the like via an internal communication line of the vehicle 10. The internal communication line of the vehicle 10 is, for example, a one-to-one communication line or an onboard network. The onboard network is, for example, a controller area network (CAN), a local interconnect network (LIN), a Flex Ray, or an onboard Ethernet. For example, the communication device 11 may transmit a predetermined signal to the outside in response to a command (request) from the gateway ECU 12. A signal received from the outside by the communication device 11 is input to the gateway ECU 12.

The gateway ECU 12 serves as a gateway between an external communication line of the vehicle 10 and the internal communication line (for example, the onboard network) of the vehicle 10.

The function of the gateway ECU 12 may be realized by arbitrary hardware, an arbitrary combination of hardware and software, or the like. For example, the gateway ECU 12 has the same hardware configuration as the central ECU 19 which will be described later and may realize various functions thereof by loading a program installed in the auxiliary storage device to a memory device and causing a central processing unit (CPU) to execute the loaded program. In the following description, the same may be true of the ECU 13.

For example, the gateway ECU 12 authenticates whether a signal received from the outside by the communication device 11 is a signal transmitted from an authorized transmission source and is a signal not tampered using a known method. The authorized transmission source refers to as transmission source which is registered as a transmission source in advance (for example, the delivery server 20 or the analysis server 30) or a transmission source which has been authenticated by bidirectional communication in advance. The gateway ECU 12 transmits only data of a signal which has been successfully authenticated out of signals received by the communication device 11 to a predetermined onboard device (for example, the ECU 13 or the central ECU 19) via the internal communication line of the vehicle 10.

For example, the gateway ECU 12 generates a signal including details such as predetermined information or a command (request) in response to requests from various devices of the vehicle 10 and transmits the generated signal to a predetermined transmission destination (for example, the delivery server 20 or the analysis server 30) via the communication device 11.

One or more ECUs 13 are mounted in the vehicle 10. The ECU 13 performs control of various functions of the vehicle 10. For example, the plurality of ECUs 13 includes an ECU 13 that controls an engine which is a power source of the vehicle 10, an ECU 13 that controls an electric motor (motor generator: MG) which is a power source of the vehicle 10, and an ECU 13 that controls a shift position of a transmission of the vehicle 10.

One or more sensors 15 are mounted in the vehicle 10. The sensor 15 outputs measurement data associated with a state of the vehicle 10. The output (measurement data) of the sensor 15 is input to the central ECU 19 via the internal communication line of the vehicle 10. For example, the plurality of sensors 15 includes a sensor 15 that measures wheel speeds of wheels of the vehicle 10 (a wheel speed sensor). For example, the plurality of sensors 15 includes a sensor 15 that measures a longitudinal acceleration, a lateral acceleration, or a vertical acceleration of the vehicle 10 (an acceleration sensor). For example, the plurality of sensors 15 includes a sensor 15 that measures the temperature of a predetermined part of the vehicle 10 (a temperature sensor). Examples of the temperature sensor include a temperature sensor that measures the temperature of a driving battery or an auxiliary-machine battery mounted in the vehicle 10, a coolant temperature sensor that measures the temperature of a coolant in various devices, and an oil temperature sensor that measures an oil temperature of a lubricant in various devices. For example, the plurality of sensors 15 includes a sensor 15 that measures a position of the vehicle 10 (a Global Navigation Satellite System (GNSS) sensor).

The input device 17 is provided in a cabin of the vehicle 10 and receives various inputs from an occupant. For example, the input device 17 includes an operation input device that receives an operation input from an occupant such as buttons, toggles, a lever, a touch panel, or a touch pad. For example, the input device 17 includes a voice input device that receives a voice input of an occupant of the vehicle 10 such as a microphone. For example, the input device 17 includes a gesture input device that receives a gesture input of an occupant of the vehicle 10 such as a camera that can capture an image of an occupant in the cabin of the vehicle 10. An input signal indicating details of the input received by the input device 17 is input to the central ECU 19 via the internal communication line of the vehicle 10.

The display device 18 is provided at a position which can be seen from a driver's seat in the cabin of the vehicle 10 and displays various information screens. The display device 18 is, for example, a liquid crystal display or an organic electroluminescence (EL) display. The display device 18 is communicatively connected to the central ECU 19 via the internal communication line of the vehicle 10, and the central ECU 19 can output a control signal to the display device 18 to display a predetermined information screen on the display device 18.

The central ECU 19 is, for example, a host control device of various ECUs including the gateway ECU 12 and the ECU 13 mounted in the vehicle 10 and comprehensively controls the operations of various ECUs or serves as a registration destination of various types of data used in the various ECUs.

The function of the central ECU 19 is realized by arbitrary hardware, an arbitrary combination of hardware and software, or the like. For example, as illustrated in FIG. 2, the central ECU 19 includes an auxiliary storage device 19A, a memory device 19B, a CPU 19C, and an interface device 19D which are connected via a bus B1.

The auxiliary storage device 19A is a nonvolatile storage means, stores a program which is installed therein, and stores necessary files, data, and the like. The auxiliary storage device 19A is, for example, a flash memory.

The memory device 19B loads a program in the auxiliary storage device 19A such that the CPU 19C can read the program, for example, when an instruction to start the program is issued. The memory device 19B is, for example, a static random access memory (SRAM).

For example, the CPU 19C executes a program loaded to the memory device 19B and realizes various functions of the central ECU 19 in accordance with commands of the program.

The interface device 19D is used, for example, as an interface for connection to the internal communication line of the vehicle 10. The interface device 19D may include a plurality of different types of interface devices to correspond to the types of a communication line connected thereto.

The program for realizing various functions of the central ECU 19 is provided, for example, by a portable recording medium 19E. In this case, the interface device 19D serves as an interface for reading data from a recording medium 19E or writing data to the recording medium 19E. The recording medium 19E is, for example, a dedicated tool that is connected to an external connection connector such as a data link coupler (DLC) via a detachable cable. The recording medium 19E may be, for example, an SD memory card or a universal serial bus (USB) memory. The program may be downloaded from another computer outside of the vehicle 10 (for example, the delivery server 20) via a predetermined communication line and installed in the auxiliary storage device 19A.

Hardware Configuration of Delivery Server

Figure 3:
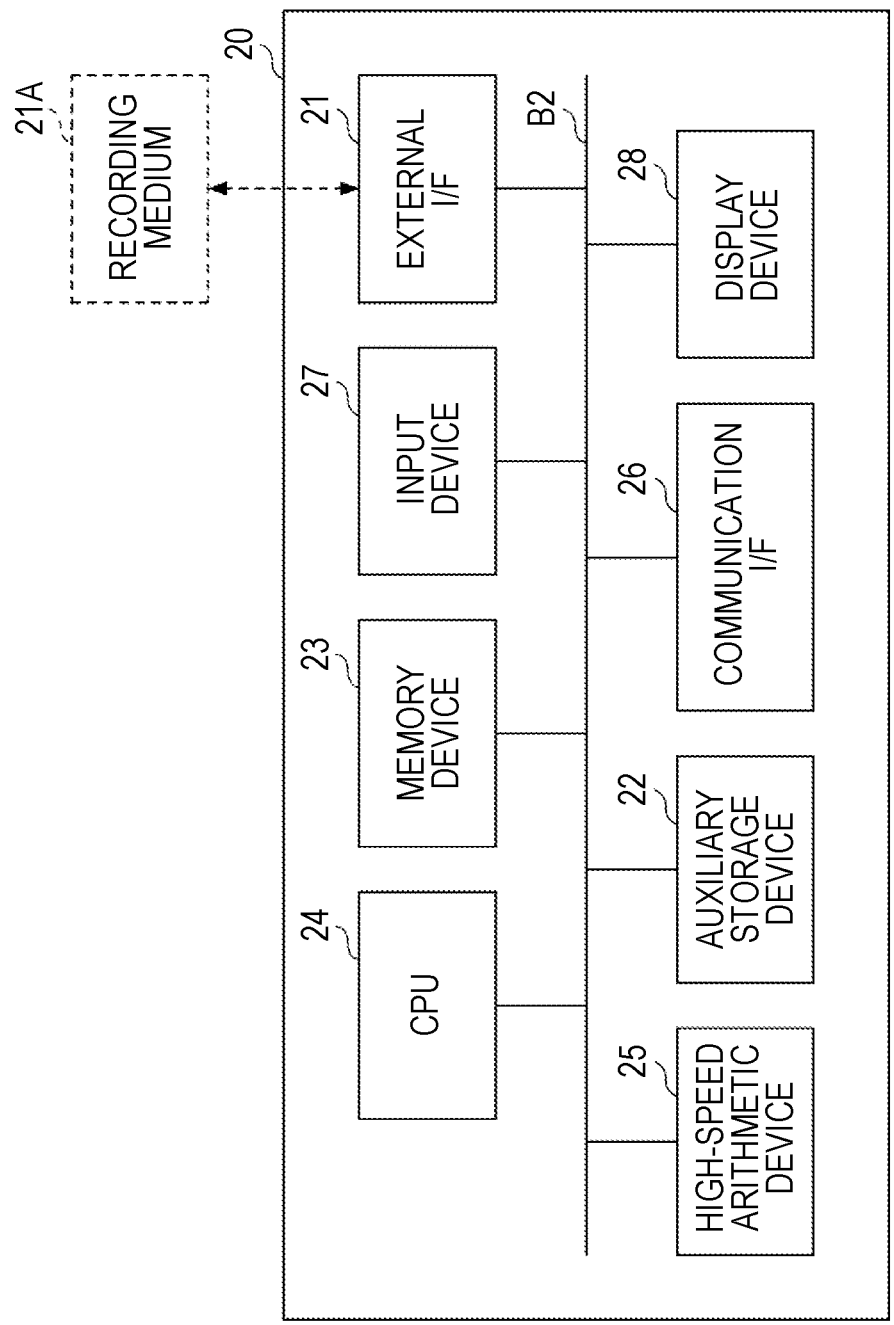
FIG. 3 is a diagram illustrating an example of a hardware configuration of a delivery server.

FIG. 3 is a diagram illustrating an example of a hardware configuration of the delivery server 20.

The function of the delivery server 20 is realized by arbitrary hardware, an arbitrary combination of hardware and software, or the like. For example, as illustrated in FIG. 2, the delivery server 20 includes an external interface 21, an auxiliary storage device 22, a memory device 23, a CPU 24, a communication interface 26, an input device 27, and a display device 28 which are connected via a bus B2.

The analysis server 30 and the user terminal 40 may have the same hardware configuration as the delivery server 20. In the following description, the hardware configurations of the analysis server 30 and the user terminal 40 will not be illustrated nor described.

The external interface 21 serves as an interface for reading data from a recording medium 21A or writing data to the recording medium 21A. The recording medium 21A may be, for example, a flexible disk, a compact disc (CD), a digital versatile disc (DVD), a Blu-ray (registered trademark) disc (BD), an SD memory card or a universal serial bus (USB) memory. Accordingly, the delivery server 20 can read various types of data used in processing and store the read data in the auxiliary storage device 22 or install programs for realizing various functions using the recording medium 21A.

The delivery server 20 may acquire various types of data or programs from an external device via the communication interface 26.

The auxiliary storage device 22 stores various installed programs and stores files, data, and the like required for various processes. The auxiliary storage device 22 includes, for example, a hard disc drive (HDD), a solid state drive (SSD), or a flash memory.

The memory device 23 reads a program from the auxiliary storage device 22 and stores the read program when an instruction to start the program is issued. The memory device 23 includes, for example, a dynamic random access memory (DRAM) or a static random access memory (SRAM).

The CPU 24 executes a program loaded from the auxiliary storage device 22 to the memory device 23 and realizes various functions of the delivery server 20 in accordance with the program.

A high-speed arithmetic device 25 cooperates with the CPU 24 and performs arithmetic processes at a relatively high speed. The high-speed arithmetic device 25 includes, for example, a graphics processing unit (GPU), an application-specific integrated circuit (ASIC), or a field-programmable gate array (FPGA).

The high-speed arithmetic device 25 may be omitted depending on a necessary arithmetic processing speed.

The communication interface 26 is used as an interface for communicative connection to an external device. Accordingly, the delivery server 20 can communicate with an external device such as the vehicle 10, the analysis server 30, or the user terminal 40 via the communication interface 26. The communication interface 26 may include a plurality of types of communication interfaces to correspond to communication modes with devices connected thereto.

The input device 27 receives various inputs from a user.

The input device 27 includes, for example, an operation input device that receives a mechanical operation input from a user. The operation input device includes, for example, buttons, toggles, a lever, a mouse, and a keyboard. The operation input device includes, for example, a touch panel mounted in the display device 28 or a touch pad installed separately from the display device 28.

The input device 27 includes, for example, a voice input device that can receive a voice input from a user. The voice input device includes, for example, a microphone that can collect voice from a user.

The input device 27 includes, for example, a gesture input device that can receive a gesture input from a user. The gesture input device includes, for example, a camera that can capture an image of gesture from a user.

The input device 27 includes, for example, a biometric input device that can receive a biometric input from a user. The biometric input device includes, for example, a camera that can acquire image data including information on a fingerprint or an iris of a user.

The display device 28 displays an information screen or an operation screen for a user. The display device 28 includes, for example, a liquid crystal display or an organic EL display.

Functional Configuration of Software Update System

A functional configuration of the software update system 1 will be described below with reference to FIG. 4 in addition to FIGS. 1 to 3.

Figure 4:
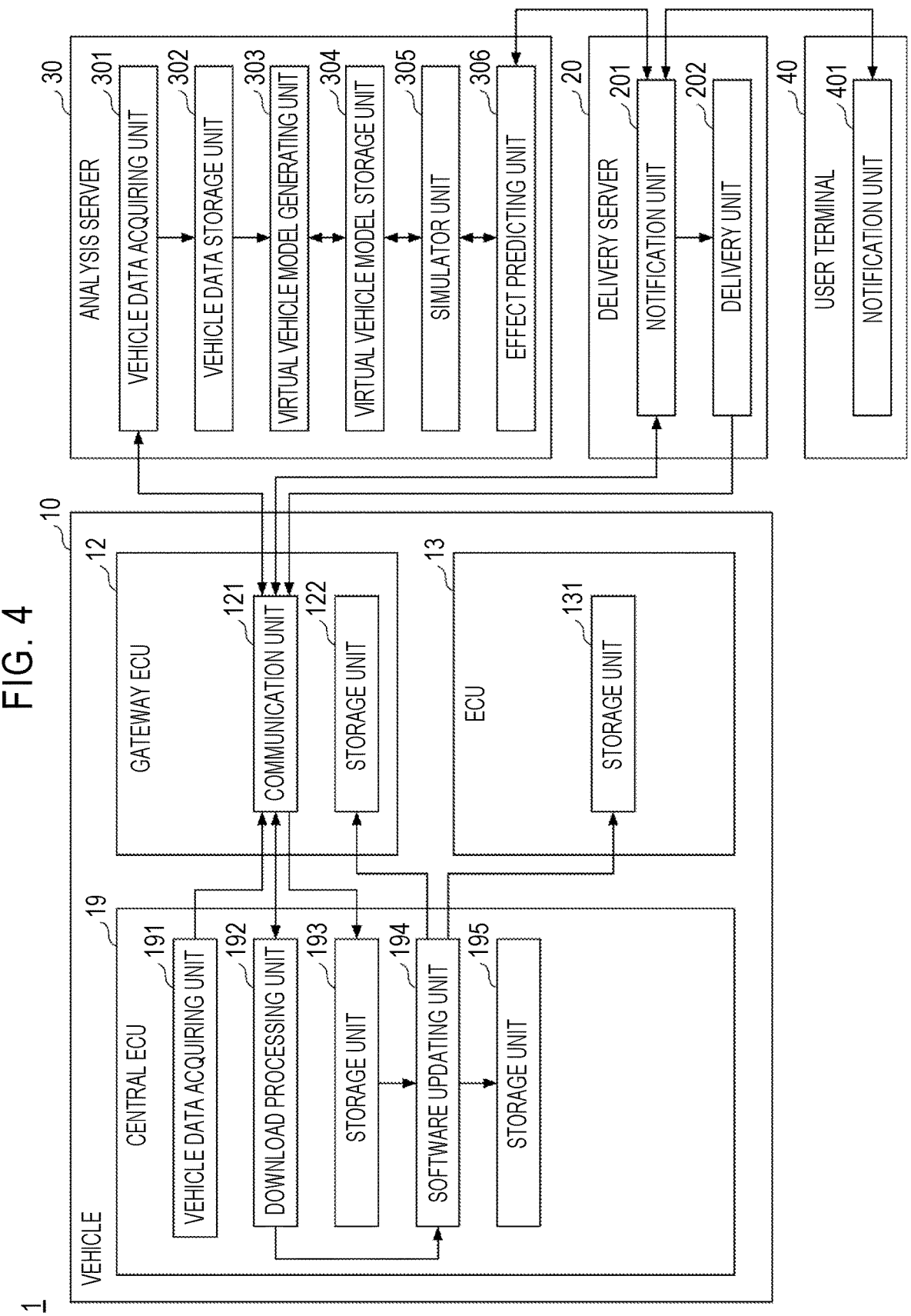
FIG. 4 is a functional block diagram illustrating an example of a functional configuration of the software update system.

FIG. 4 is a functional block diagram illustrating an example of the functional configuration of the software update system 1.

Functional Configuration of Vehicle

As illustrated in FIG. 4, the gateway ECU 12 includes a communication unit 121 and a storage unit 122 as functional units. The function of the communication unit 121 may be realized, for example, by loading a program installed in the auxiliary storage device of the gateway ECU 12 to the memory device and causing the CPU to execute the program. The function of the storage unit 122 may be realized, for example, by a storage area which is defined in the auxiliary storage device or the like of the gateway ECU 12.

The communication unit 121 controls the communication device 11 such that a signal received from the outside of the vehicle 10 is input to the gateway ECU 12 or a signal is transmitted to the outside of the vehicle 10.

Various types of data used in the gateway ECU 12 are stored in the storage unit 122. For example, data of various programs installed in the gateway ECU 12 (the auxiliary storage device) is registered (stored) in the storage unit 122. For example, data of parameters which are referred to in processes based on various programs of the gateway ECU 12 is registered (stored) in the storage unit 122.

The ECU 13 includes a storage unit 131 as a functional unit. The function of the storage unit 131 is realized, for example, by a storage area which is defined in the auxiliary storage device of the ECU 13.

Various types of data used in the ECU 13 are stored in the storage unit 131. For example, data of various programs installed in the ECU 13 (the auxiliary storage device) is registered (stored) in the storage unit 131. For example, data of parameters which are referred to in the processes based on various programs of the ECU 13 is registered (stored) in the storage unit 131.

The central ECU 19 includes a vehicle data acquiring unit 191, a download processing unit 192, a storage unit 193, a software updating unit 194, and a storage unit 195 as functional units. The functions of the vehicle data acquiring unit 191, the download processing unit 192, and the software updating unit 194 may be realized, for example, by loading a program installed in the auxiliary storage device 19A to the memory device 19B and causing the CPU 19C to execute the program. The functions of the storage units 193 and 195 may be realized, for example, by storage areas which are defined in the auxiliary storage device 19A.

The vehicle data acquiring unit 191 acquires vehicle data indicating a state of the vehicle 10 and transmits the acquired vehicle data to the analysis server 30.

For example, the vehicle data acquiring unit 191 acquires vehicle data indicating the state of the vehicle 10 every predetermined period and transmits (uploads) the acquired vehicle data to the analysis server 30 via the gateway ECU 12 (the communication device 11). For example, the vehicle data acquiring unit 191 may upload the acquired vehicle data to the analysis server 30 in real time or may accumulate the acquired vehicle data in the memory device 19B or the auxiliary storage device 19A and transmit the accumulated vehicle data together to the analysis server 30 at a predetermined time.

For example, the vehicle data acquiring unit 191 acquires newest vehicle data in response to a request from the analysis server 30 received via the gateway ECU 12 (the communication device 11) and transmits the acquired newest vehicle data to the analysis server 30 via the gateway ECU 12 (the communication device 11).

The vehicle data to be transmitted includes, for example, measurement data output from the sensor 15. The vehicle data to be transmitted includes, for example, command values output from various ECUs such as the gateway ECU 12, the ECU 13, and the central ECU 19 or control data such as values of arithmetic results in the process of control.

The download processing unit 192 performs a process of downloading update data of software from the delivery server 20.

The storage unit 193 stores update data of software downloaded from the delivery server 20.

The software updating unit 194 updates software which is used in the gateway ECU 12, the ECU 13, the central ECU 19, and the like using the update data of software downloaded to the storage unit 193.

Various types of data which are used in the central ECU 19 are stored in the storage unit 195. For example, data of various programs installed in the central ECU 19 (the auxiliary storage device) is registered (stored) in the storage unit 195. For example, data of parameters which are referred to in processing of various programs of the central ECU 19 is registered (stored) in the storage unit 195.

Functional Configuration of Delivery Server

As illustrated in FIG. 4, the delivery server 20 includes a notification unit 201 and a delivery unit 202 as functional units. The functions of the notification unit 201 and the delivery unit 202 are realized, for example, by loading a program installed in the auxiliary storage device 22 to the memory device 23 and causing the CPU 24 to execute the program.

When there is update data of software used in the vehicle 10, the notification unit 201 notifies a user of the vehicle 10 that there is update data of software. When the software update system 1 includes a plurality of vehicles 10, the notification unit 201 notifies only users of vehicles 10 of which software is to be updated based on the update data out of the plurality of vehicles 10 that there is update data of software. For example, this is because whether to update software and details of update differ depending on vehicle models when the plurality of vehicles 10 includes two or more models of vehicles 10. For example, this is because whether to update software and details of update differ depending on grades even when the plurality of vehicles 10 is the same model. For example, this is also because a service which can be received by a user differs depending on contract details between a user and a service provider in association with update of software of a vehicle 10, that is, a service which is provided to a user differs depending on a fee (charge), and thus details of update of software differ.

Specifically, the notification unit 201 transmits a signal for requesting predicting an effect of software update for a vehicle 10 to which update data is to be delivered to the analysis server 30. At this time, when there are two or more vehicles 10 to which update data is to be delivered, the notification unit 201 requests the analysis server 30 to predict an effect of software update for each of the plurality of vehicles 10. When data of prediction results of an effect of software update is received from the analysis server 30, the notification unit 201 determines whether the effect of software update in a corresponding vehicle 10 satisfies a predetermined reference with which a user can be determined to actually feel the effect. When the effect of software update in the corresponding vehicle 10 satisfies the predetermined reference, the notification unit 201 transmits a signal indicating that there is update data of software to the vehicle 10. Accordingly, the central ECU 19 (the download processing unit 192) of the vehicle 10 can notify a user that there is update data of software via the display device 18. In this case, the notification unit 201 may transmit a signal indicating that there is update data of software to the user terminal 40 of the user of the vehicle 10 instead of or in addition to the vehicle 10. Accordingly, the user terminal 40 (the notification unit 401) can notify the user of the vehicle 10 that there is update data of software via the display device. In this case, when the user needs to pay a fee (charge) for the purpose of software update, the notification unit 201 may transmit a signal indicating that there is update data of software and including the fee required for the software update to the vehicle 10 or the user terminal 40. Accordingly, the central ECU 19 (the download processing unit 192) of the vehicle 10 can notify the user of the vehicle 10 that there is update data of software along with the fee required for the software update using the display device 18. The user terminal 40 (the notification unit 401) can notify the user of the vehicle 10 that there is update data of software along with the fee required for the software update using the display device. On the other hand, when the effect of software update of the corresponding vehicle 10 does not satisfy the predetermined reference, the notification unit 201 does not transmit a signal indicating that there is update data of software to the corresponding vehicle 10 or the user terminal 40 of the user. Accordingly, since the delivery server 20 does not notify the user that there is update data of software which is less effective for the corresponding vehicle 10, it is possible to curb occurrence of a situation in which software is updated based on the update data. As a result, the delivery server 20 can more appropriately update software which is used in the vehicle 10.

The delivery unit 202 delivers the update data of software to the vehicle 10. For example, when the effect of software update in the corresponding vehicle 10 satisfies the predetermined reference and an update permission signal is received from the vehicle 10 or the user terminal 40, the notification unit 201 transmits a delivery command of update data to the delivery unit 202, and the delivery unit 202 transmits the update data to the corresponding vehicle 10 in response to the delivery command. On the other hand, when the effect of software update in the corresponding vehicle 10 does not satisfy the predetermined reference, the delivery unit 202 withholds delivery of the update data. Accordingly, the delivery server 20 can curb update of software which is less effective in the corresponding vehicle 10 and thus more appropriately update software which is used in the vehicle 10.

Functional Configuration of Analysis Server

As illustrated in FIG. 4, the analysis server 30 includes a vehicle data acquiring unit 301, a vehicle data storage unit 302, a virtual vehicle model generating unit 303, a virtual vehicle model storage unit 304, a simulator unit 305, and an effect predicting unit 306 as functional units. The functions of the virtual vehicle model generating unit 303, the simulator unit 305, and the effect predicting unit 306 are realized, for example, by loading a program installed in the auxiliary storage device of the analysis server 30 to the memory device and causing the CPU to execute the program. The function of the virtual vehicle model storage unit 304 is realized, for example, by a storage area defined in the auxiliary storage device of the analysis server 30.

The vehicle data acquiring unit 301 acquires vehicle data received from a vehicle 10 or an external device associated with the vehicle 10.

The vehicle data storage unit 302 stores the vehicle data acquired by the vehicle data acquiring unit 301.

The virtual vehicle model generating unit 303 (an example of a generation unit) generates a virtual model corresponding to the vehicle 10 (hereinafter referred to as a "virtual vehicle model"). The virtual vehicle model is a model with which various characteristics of the vehicle 10 are reproduced in a virtual space. For example, the virtual vehicle model may be a full vehicle model with which all the characteristics of the vehicle 10 are reproduced or may be a partial vehicle model with which only some characteristics (performance) of the vehicle 10 which is an effect prediction object which will be described later are reproduced. The virtual vehicle model may be a three-dimensional model with which a part or whole shape of the vehicle 10 is reproduced.

For example, the virtual vehicle model generating unit 303 generates a virtual vehicle model by reflecting vehicle data indicating a newest state of the vehicle 10 stored in the vehicle data storage unit 302 in a versatile virtual model which is common to vehicles 10 of the same model or the same model and the same grade. The versatile virtual model may be, for example, a full vehicle model or a partial vehicle model with final specifications of a vehicle model or grade corresponding to the vehicle 10 and prepared in a development stage of the vehicle model corresponding to the vehicle 10.

For example, the virtual vehicle model generating unit 303 generates and updates a virtual model based on the vehicle data which is repeatedly acquired in a time series by the vehicle data acquiring unit 301. Specifically, the virtual vehicle model generating unit 303 may generate and update a virtual vehicle model based on the vehicle data which is repeatedly uploaded from the vehicles 10 using the vehicle model common to the vehicles 10 as a base. Accordingly, the virtual vehicle model generating unit 303 can generate (update) a virtual vehicle model based on at least one of aging variation of the vehicle 10, operating conditions of the vehicle 10, and change in elements of the vehicle 10. Accordingly, it is possible to reflect aging variation of a vehicle 10, operating conditions of the vehicle 10, or change in elements of the vehicle 10 in a virtual vehicle model. For example, the operating conditions of a vehicle 10 may include conditions of an environment in which the vehicle 10 is used, traveling conditions when the vehicle 10 is used, and conditions of a frequency the vehicle 10 is used. For example, the change in elements of a vehicle 10 includes change in hardware such as components of the vehicle 10, change in software of the vehicle 10, and change in types of a coolant or a lubricant used in the vehicle 10. The virtual vehicle model generating unit 303 may generate the virtual vehicle model based on data about manufacturing irregularities of the vehicle 10 stored in the vehicle data storage unit 302. Accordingly, the virtual vehicle model generating unit 303 can reflect manufacturing irregularities of the vehicle 10 in the virtual vehicle model. The virtual vehicle model generating unit 303 may generate a digital twin which is the virtual vehicle model by updating the virtual vehicle model in real time based on vehicle data which is sequentially uploaded from the vehicle 10.

The virtual vehicle model generated by the virtual vehicle model generating unit 303 is stored in the virtual vehicle model storage unit 304. When the number of vehicles 10 included in the software update system 1 is two or more, the virtual vehicle model for each of the two or more vehicles 10 is stored.

The simulator unit 305 performs virtual simulation on a vehicle 10 using the virtual vehicle model of the vehicle 10 registered (stored) in the virtual vehicle model storage unit 304. The virtual simulation on the vehicle 10 includes traveling simulation of the vehicle 10 under predetermined traveling conditions.

The effect predicting unit 306 (an example of a prediction unit) predicts an effect acquired by updating software used in the vehicle 10 in response to a request from the delivery server 20.

The effect predicting unit 306 predicts an effect of update of software to be updated, for example, based on details of software update and vehicle data of the vehicle 10 of which software is to be updated (for example, see FIGS. 5 and 6 which will be described later). Specifically, the effect predicting unit 306 predicts the effect of software update by determining to what extent the traveling conditions or the conditions on the operating environment of the vehicle 10 which are changed by the software update correspond to the operating state of the vehicle 10 which is recognized based on the vehicle data of the vehicle 10. This is because the frequency in which the traveling conditions or the conditions on the operating environment affected by the software update are satisfied varies depending on the operating state of the vehicle 10.

The effect predicting unit 306 may predict the effect of software update, for example, by causing the simulator unit 305 to perform virtual simulation on the vehicle 10 using the virtual vehicle model of the vehicle 10 (for example, see FIGS. 7 and 8 which will be described later). Specifically, the virtual vehicle model generating unit 303 generates a virtual vehicle model corresponding to a case in which software update is performed using the newest virtual vehicle model of the vehicle 10 as a base in accordance with an instruction from the effect predicting unit 306. The simulator unit 305 performs virtual simulation of travel of the vehicle 10 under predetermined traveling conditions using the virtual vehicle model corresponding to the vehicle 10 after the software update has been performed in accordance with an instruction from the effect predicting unit 306. The virtual simulation of the vehicle 10 is performed and thus the predetermined traveling conditions vary depending on details of the software update. Then, the effect predicting unit 306 predicts an effect of the software update based on the result of the virtual simulation using the virtual vehicle model corresponding to the vehicle 10 after the software update has been performed. For example, the effect predicting unit 306 may predict the effect of software update by comparing the newest vehicle data stored in the vehicle data storage unit 302 with data of the result of virtual simulation corresponding to the vehicle data of the vehicle 10 after the software update has been performed. Accordingly, the effect predicting unit 306 can predict the effect of software update using a relatively simple method based on the assumption that the existing (newest) vehicle data of the vehicle 10 stored in the vehicle data storage unit 302 is the state of the vehicle 10 before the software update has been performed. For example, the effect predicting unit 306 may predict the effect of software update by comparing the results of virtual simulation using virtual vehicle models corresponding to the vehicle 10 before and after the software update has been performed. In this case, the effect predicting unit 306 causes the simulator unit 305 to perform virtual simulation using the virtual vehicle model corresponding to the vehicle 10 before the software update has been performed as well as virtual simulation using the virtual vehicle model corresponding to the vehicle 10 after the software update has been performed under the same conditions. Accordingly, the effect predicting unit 306 can substantially match the traveling conditions and the like used as the premise of data to be compared. As a result, the effect predicting unit 306 can more accurately predict the effect.

For example, the effect predicting unit 306 may predict the effect by determining whether an index value improved by the software update satisfies a predetermined reference. The effect predicting unit 306 may predict the effect based on the index value improved by the software update.

The effect predicting unit 306 may select a method of predicting an effect, for example, based on details of the software update. Specifically, the effect predicting unit 306 may determine whether to perform virtual simulation based on the virtual vehicle model corresponding to the vehicle 10 at the time of predicting the effect of software update based on the details of software update. Whether to perform virtual simulation may be prescribed, for example, for each piece of update data and may be automatically determined based on the prescribed details. Whether to perform virtual simulation may be determined, for example, using table information or the like based on details of update data and items of the effects of software update.

For example, the effect predicting unit 306 may predict whether the software update is effective or a degree of effectiveness in consideration of a period in which the user will use the vehicle 10 in the future. The effect predicting unit 306 may predict the period in which the user will use the vehicle 10 in the future with reference to data such as a time at which the vehicle 10 was registered as a new vehicle and a time at which the vehicle 10 was inspected last which are stored in the vehicle data storage unit 302. For example, this is because a period in which the user benefits from the software update is short and there is a likelihood that the effect will decrease substantially when the user is going to change the vehicle 10 after a relatively short time. Specifically, the effect predicting unit 306 may set the predetermined reference for determining that it is effective or a reference for defining the degree of effectiveness to increase relatively as the period in which the user will use the vehicle 10 in the future becomes shorter. The effect predicting unit 306 may predict that the software update will not be effective when the period in which the user will use the vehicle 10 in the future does not satisfy the predetermined reference.

Functional Configuration of User Terminal

As illustrated in FIG. 4, the user terminal 40 includes a notification unit 401 as a functional unit. The function of the notification unit 401 is realized, for example, by loading a program installed in the auxiliary storage device of the user terminal 40 to the memory device and causing the CPU to execute the program.

The notification unit 401 notifies the user that there is update data of software of the vehicle 10 via the display device based on the signal received from the delivery server 20. Accordingly, the user of the vehicle 10 can ascertain whether there is update data of software of the vehicle 10 at a time other than when the vehicle 10 is being used. As a result, for example, the user can input software update permission to the user terminal 40 and complete the software update at a time at which the vehicle 10 is not used.

Examples of Method of Predicting Effect of Software Update of Vehicle

Examples of the method of predicting an effect of software update of a vehicle 10 which is performed by the effect predicting unit 306 will be described below with reference to FIGS. 5 to 8.

First Example

Figure 5:
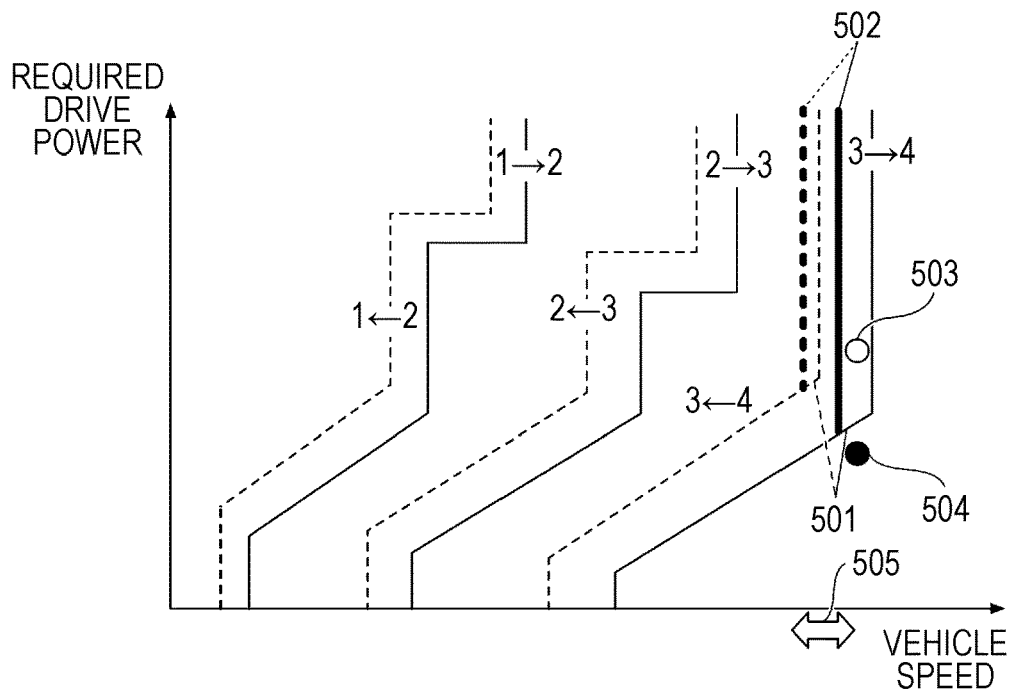
FIG. 5 is a diagram illustrating an example of update of a gear shift map of a transmission of a vehicle.

FIG. 5 is a diagram illustrating an example of update of a gear shift map of a transmission in a vehicle 10. Specifically, FIG. 5 illustrates switching conditions between the first gear stage and the second gear stage of the transmission in the vehicle 10, between the second gear stage and the third gear stage, and between the third gear stage and the fourth gear stage in a coordinate system with a vehicle speed of the vehicle 10 as the horizontal axis and required driving power of the vehicle 10 as the vertical axis.

The required driving power of the vehicle 10 is determined, for example, based on an accelerator operation amount of a driver of the vehicle 10. In FIG. 5, solid lines represent switching conditions (a gear shift line) at the time of shift-up, and dotted lines represent switching conditions (a gear shift line) at the time of shift-down.

As illustrated in FIG. 5, in this example, the switching conditions between the third gear stage and the fourth gear stage are changed from a gear shift line 501 to a gear shift line 502 through software update of the ECU 13 that performs control of the shift position of the transmission.

For example, a case in which a user of a vehicle 10 uses an operating point 503 at a relatively high frequency is conceived. Based on the premise of the gear shift line 501, at the operating point 503, shift-up from the third gear stage to the fourth gear stage in the transmission is not performed, the third gear stage is maintained, and thus the rotation speed of the prime mover such as the engine or the electric motor is maintained relatively high. Accordingly, energy consumption of the vehicle 10 increases relatively. On the other hand, when software update is performed and the switching conditions are updated to the gear shift line 502, shift-up from the third gear stage to the fourth gear stage in the transmission is completed at the operating point 503, the fourth gear stage is maintained, and thus the rotation speed of the prime mover such as the engine or the electric motor is maintained relatively low. Accordingly, the energy consumption of the vehicle 10 decreases relatively, and fuel efficiency or electric power efficiency is improved. As a result, the effect predicting unit 306 can predict that there is an effect on improvement in energy consumption by software update or that the degree of effect is relatively high.

For example, a case in which the user of the vehicle 10 uses an operating point 504 which is in the same vehicle speed range as the operating point 503 and which is in a smaller required driving power than that at the operating point 503 at a relatively high frequency is conceived. In this case, regardless of the gear shift lines 501 and 502, shift-up from the third gear stage to the fourth gear stage in the transmission is completed at the operating point 504 and the fourth gear stage is maintained. Accordingly, the effect predicting unit 306 can predict that there is no effect of software update or that the degree of effect is relatively low. For example, the same may be true when the user of the vehicle 10 does not use a vehicle speed range 505 which is affected by changing of the switching conditions or the frequency thereof is very low.

In this way, in this example, the effect predicting unit 306 can predict an effect of software (gear shift map) update based on vehicle data of the required driving power and the vehicle speed which are sequentially uploaded from the vehicle 10 (accumulated in the vehicle data storage unit 302).

The effect predicting unit 306 may predict an effect of software update based on a result of virtual simulation based on a virtual vehicle model of the vehicle 10 for update of software associated with the switching conditions of shift-up/down in the transmission. For example, the effect predicting unit 306 may predict an effect in power performance under predetermined traveling conditions of the vehicle 10 through virtual simulation based on the virtual vehicle model of the vehicle 10 for update of software associated with the switching conditions of shift-up/down in the transmission.

Second Example

Figure 6:
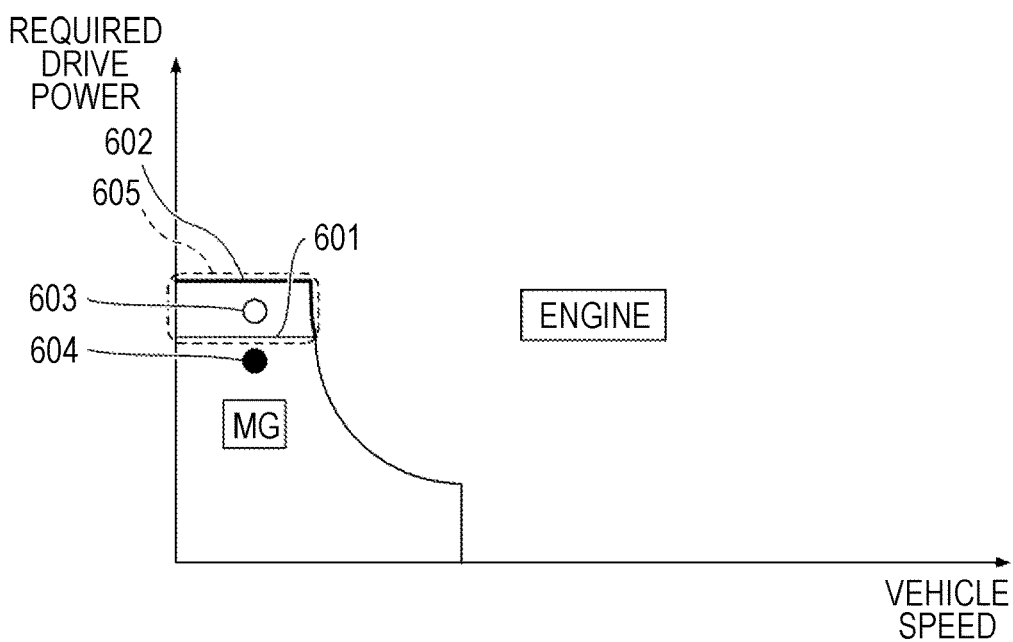
FIG. 6 is a diagram illustrating an example of update of a switching map of a prime mover in a vehicle.

FIG. 6 is a diagram illustrating an example of update of a switching map for a prime mover in a vehicle 10. In this example, the vehicle 10 is a so-called hybrid electric vehicle that can travel by switching between two prime movers including an engine and an electric motor. Specifically, FIG. 6 illustrates switching conditions between a state in which the vehicle 10 is allowed to travel using only the electric motor (MG) with the engine stopped and a state in which the vehicle 10 is allowed to travel using the engine with the engine started in a coordinate system with a vehicle speed of the vehicle 10 as the horizontal axis and required driving power of the vehicle 10 as the vertical axis.

The state in which the vehicle 10 is allowed to travel using the engine can include a state in which the vehicle 10 is allowed to travel using only the engine and a state in which the vehicle 10 is allowed to travel using both the engine and the electric motor.

As illustrated in FIG. 6, in this example, the switching conditions for switching between the state in which the vehicle 10 is allowed to travel using only the electric motor and the state in which the vehicle 10 is allowed to travel using the engine are updated from a switching line 601 (a thin solid line) to a switching line 602 (a thick solid line) through update of software in the ECU 13 that comprehensively controls the operating states of the two prime movers.

For example, a case in which a user of a vehicle 10 uses an operating point 603 at a relatively high frequency is conceived. Based on the premise of the switching line 601, at the operating point 603, the engine is started and the vehicle 10 travels using power of the engine. On the other hand, when software update is performed and the switching conditions are updated to the switching line 602, the vehicle 10 can be allowed to travel using power of only the electric motor at the operating point 603, and thus fuel efficiency of the vehicle 10 is improved. Accordingly, the effect predicting unit 306 can predict that there is an effect on improvement in fuel efficiency of the vehicle 10 by software update or that the degree of effect is relatively high.

For example, a case in which the user of the vehicle 10 uses an operating point 604 which is in the same vehicle speed range as the operating point 603 and which is in a smaller required driving power than that at the operating point 603 at a relatively high frequency is conceived. In this case, regardless of the switching lines 601 and 602, the vehicle 10 is allowed to travel power of only the electric motor at the operating point 604. Accordingly, the effect predicting unit 306 can predict that there is no effect on improvement in fuel efficiency of the vehicle 10 by software update or that the degree of effect is relatively low. For example, the same may be true when the user of the vehicle 10 does not use an operation area 605 which is affected by changing of the switching conditions or the frequency thereof is very low.

In this way, in this example, the effect predicting unit 306 can predict an effect of software (switching map of a prime mover) update based on vehicle data of the required driving power and the vehicle speed which are sequentially uploaded from the vehicle 10.

Third Example

Figure 7:
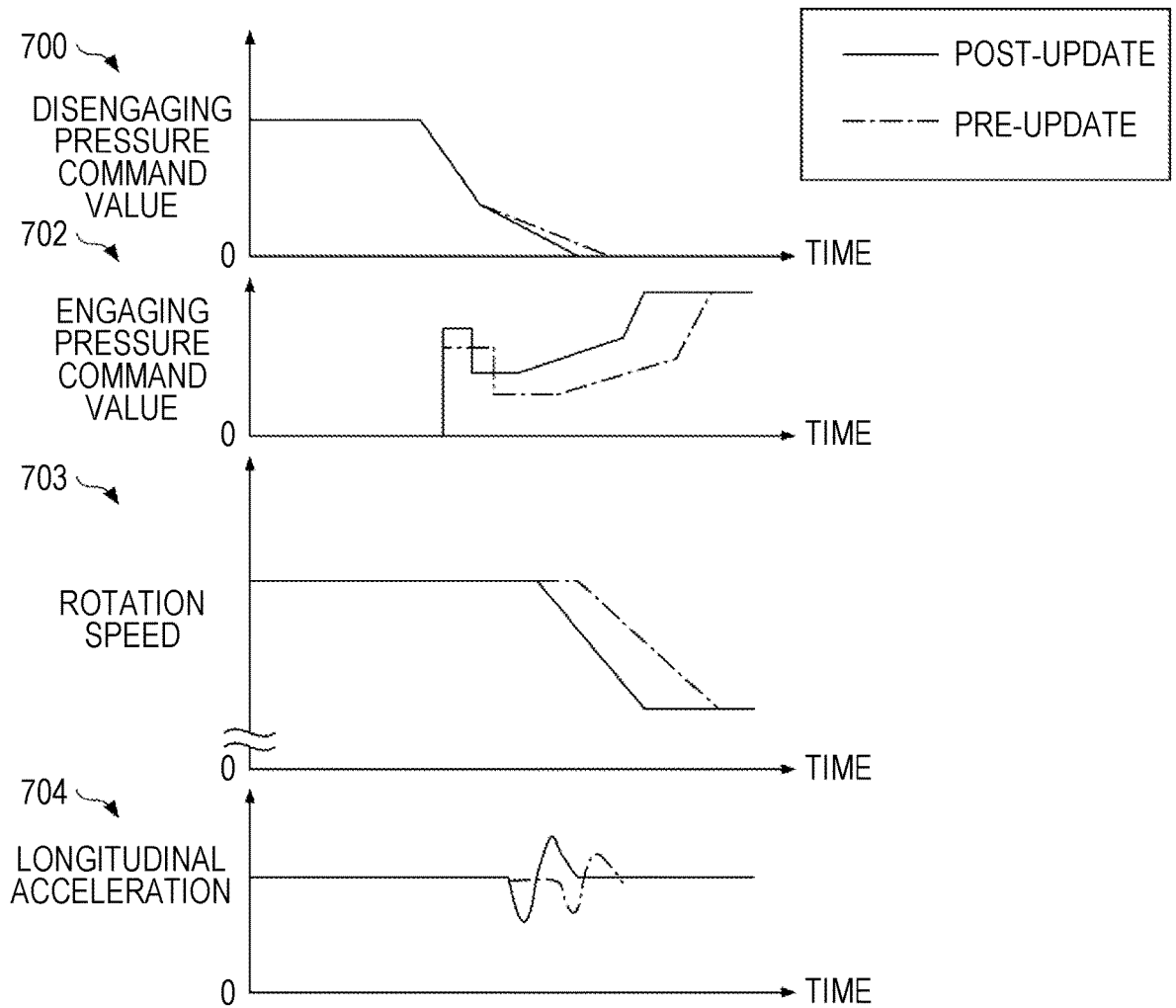
FIG. 7 is a diagram illustrating an example of a result of virtual simulation for aging variation of a vehicle state at the time of gear shift of a transmission in a vehicle before and after a control logic for gear shift (shift-up) of the transmission is updated.

FIG. 7 is a diagram illustrating an example (a timing chart 700) of a result of virtual simulation for aging variation of a vehicle state at the time of gear shift of a transmission in a vehicle 10 before and after a control logic for gear shift (shift-up) of the transmission of the vehicle 10 is updated. Specifically, FIG. 7 illustrates a result of virtual simulation based on a virtual vehicle model of a vehicle 10 included in the software update system 1. The timing chart 700 includes timing charts 701 to 704 indicating aging variation of a disengaging pressure command value, an engaging pressure command value, a rotation speed of a prime mover (an engine), and longitudinal acceleration of the vehicle 10 at the time of gear shift of the transmission. FIG. 8 is a diagram illustrating another example (a timing chart 800) of the result of virtual simulation for aging variation of a vehicle state at the time of gear shift of a transmission in a vehicle 10 before and after a control logic for gear shift (shift-up) of the transmission of the vehicle 10 is updated. Specifically, FIG. 8 illustrates a result of virtual simulation based on a virtual vehicle model of another vehicle 10 included in the software update system 1 and mounted with a transmission of the same specifications as in the aforementioned vehicle 10. The timing chart 800 includes timing charts 801 to 804 indicating aging variation of a disengaging pressure command value, an engaging pressure command value, a rotation speed of an output shaft of a transmission, and longitudinal acceleration of the vehicle 10 at the time of gear shift of the transmission.

The disengaging pressure command value indicates a command value of a hydraulic pressure for operating elements (for example, a brake or a clutch) of the transmission switching from an engaged state to a disengaged state by the gear shift. The engaging pressure command value indicates a command value of a hydraulic pressure for operating elements of the transmission switching from the disengaged state to the engaged state by the gear shift. In FIGS. 7 and 8, the control logics for gear shift of the transmission before and after the software update is performed are the same. Accordingly, the timing charts 701 and 702 and the timing charts 801 and 802 corresponding to the control logic are the same.

Figure 8:
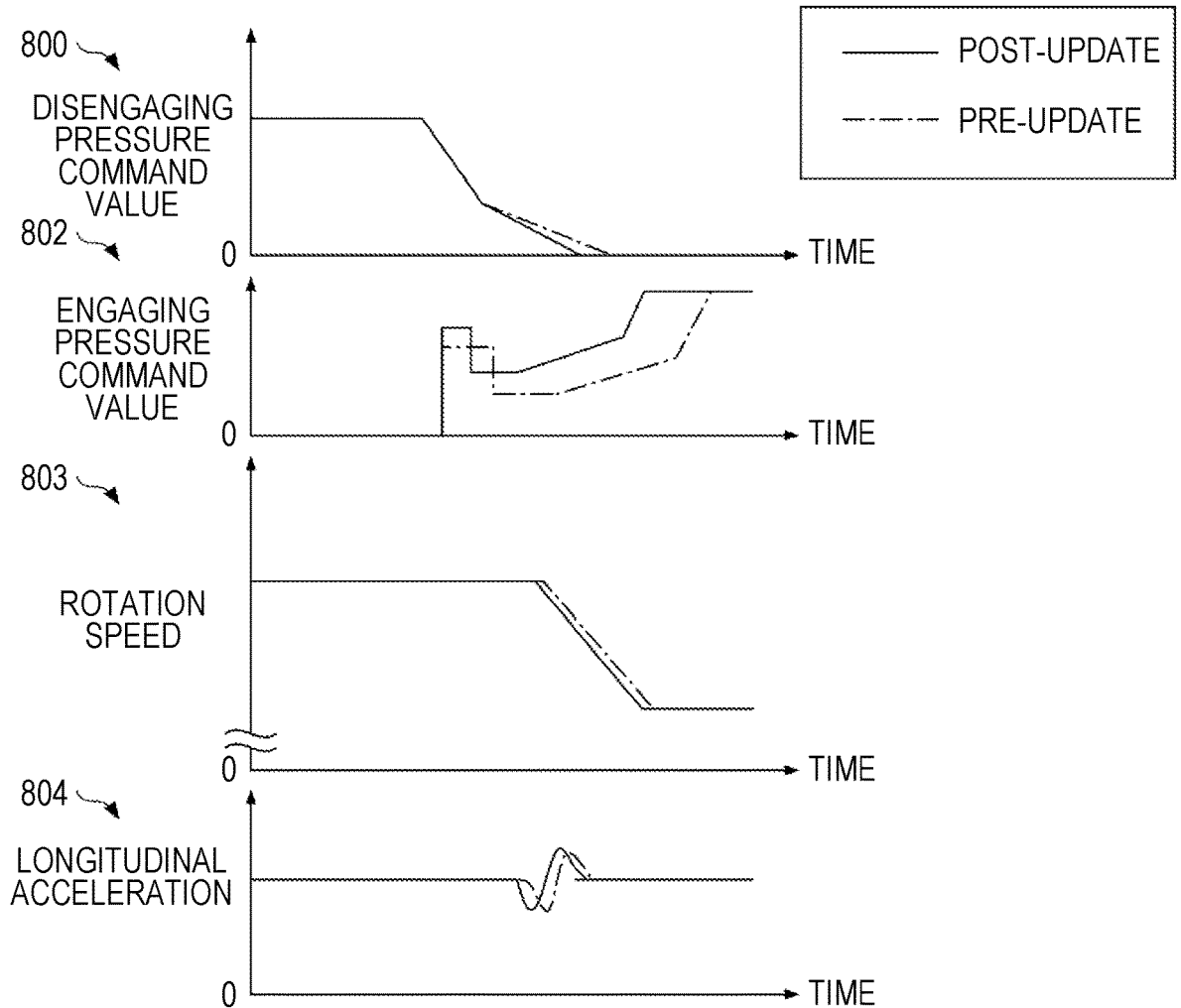
FIG. 8 is a diagram illustrating another example of the result of virtual simulation for aging variation of a vehicle state at the time of gear shift of a transmission in a vehicle before and after a control logic for gear shift (shift-up) of the transmission is updated.

As illustrated in FIGS. 7 and 8, in this example, the control logic of gear shift of the transmission is updated such that a time (a gear shift time) from a start of gear shift (shift-up) (a start of decrease of the disengaging pressure command value) to an end (an end of increase of the engaging pressure command value) is shortened.

In the timing chart 703, a change speed (a rate of change with the elapse of time) of the rotation speed of the prime mover (the engine) due to gear shift of the transmission also increases relatively with updating of the control logic. In the timing chart 704, fluctuation of the longitudinal acceleration of the vehicle 10 due to gear shift of the transmission increases relatively. Accordingly, a user can clearly feel improvement in speed of gear shift (a gear shift speed). As a result, in case of the vehicle 10 illustrated in FIG. 7, the effect predicting unit 306 can predict that there is an effect on improvement in gear shift speed due to software update or that the degree of effect is relatively high.

On the other hand, in the timing chart 803, a change speed (a rate of change with the elapse of time) of the rotation speed of the prime mover (the engine) due to gear shift of the transmission does not vary substantially before and after the control logic is updated. In the timing chart 804, fluctuation of the longitudinal acceleration of the vehicle 10 due to gear shift of the transmission does not vary substantially in magnitude thereof before and after the control logic is updated. Accordingly, a user can is less likely to actually feel improvement in speed of gear shift (a gear shift speed). As a result, in case of the vehicle 10 illustrated in FIG. 8, the effect predicting unit 306 can predict that there is no effect on improvement in gear shift speed due to software update or that the degree of effect is relatively low.

As one reason why there is a difference in effect of update of a control logic between vehicles 10 mounted with a transmission of the same specifications, for example, an influence of viscosity of a lubricant used in the transmission is conceived. For example, when a commercially available lubricant with higher viscosity than a lubricant which is filled at the time of shipment is used in the transmission, there is a likelihood that a user is less likely to actually feel improvement in gear shift speed. As one reason why there is a difference in effect of update of a control logic between vehicles 10 mounted with a transmission of the same specifications, for example, an influence of manufacturing irregularities in clearance of a clutch pack of the transmission is conceived. For example, when clearance of the clutch pack of the transmission is close to a lower limit of a manufacturing allowable range, there is a likelihood that a user is less likely to actually feel improvement in gear shift speed than when the clearance is close to an upper limit. As one reason why there is a difference in effect of update of a control logic between vehicles 10 mounted with a transmission of the same specifications, for example, an influence of a cumulative gear shift frequency of the transmission is conceived. For example, when the cumulative gear shift frequency after shipment of the vehicle 10 or after replacement with a new transmission has been performed is relatively low, there is a likelihood that the clearance of the clutch pack of the transmission is less and a user is less likely to actually feel improvement in gear shift speed than that when the cumulative gear shift frequency is relatively high. As one reason why there is a difference in effect of update of a control logic between vehicles 10 mounted with a transmission of the same specifications, for example, an influence of air leakage of a solenoid valve that performs engagement and disengagement of a clutch or a brake of the transmission is conceived. For example, when air leakage of the solenoid valve of the transmission is relatively small, the gear shift speed is higher than that when the air leakage is relatively large, and thus there is a likelihood that a user is less likely to actually feel improvement in gear shift speed even when update of the control logic is performed. As one reason why there is a difference in effect of update of a control logic between vehicles 10 mounted with a transmission of the same specifications, for example, an influence of a temperature environment in which the vehicle 10 is used is conceived. For example, when the vehicle 10 is used in a so-called cold region in which the temperature is very low, viscosity of a lubricant is higher than that when the vehicle is used at a relatively high temperature, and thus there is a likelihood that a user is less likely to actually feel improvement in gear shift speed even when update of the control logic is performed.

In this way, in this example, the effect predicting unit 306 can predict an effect of update of software (a program associated with a control logic for gear shift of the transmission) based on the result of virtual simulation for gear shift of the transmission based on a virtual vehicle model.

Software Update Process

A software update process in a vehicle 10 will be described below with reference to FIGS. 9 to 11.

Figure 9:
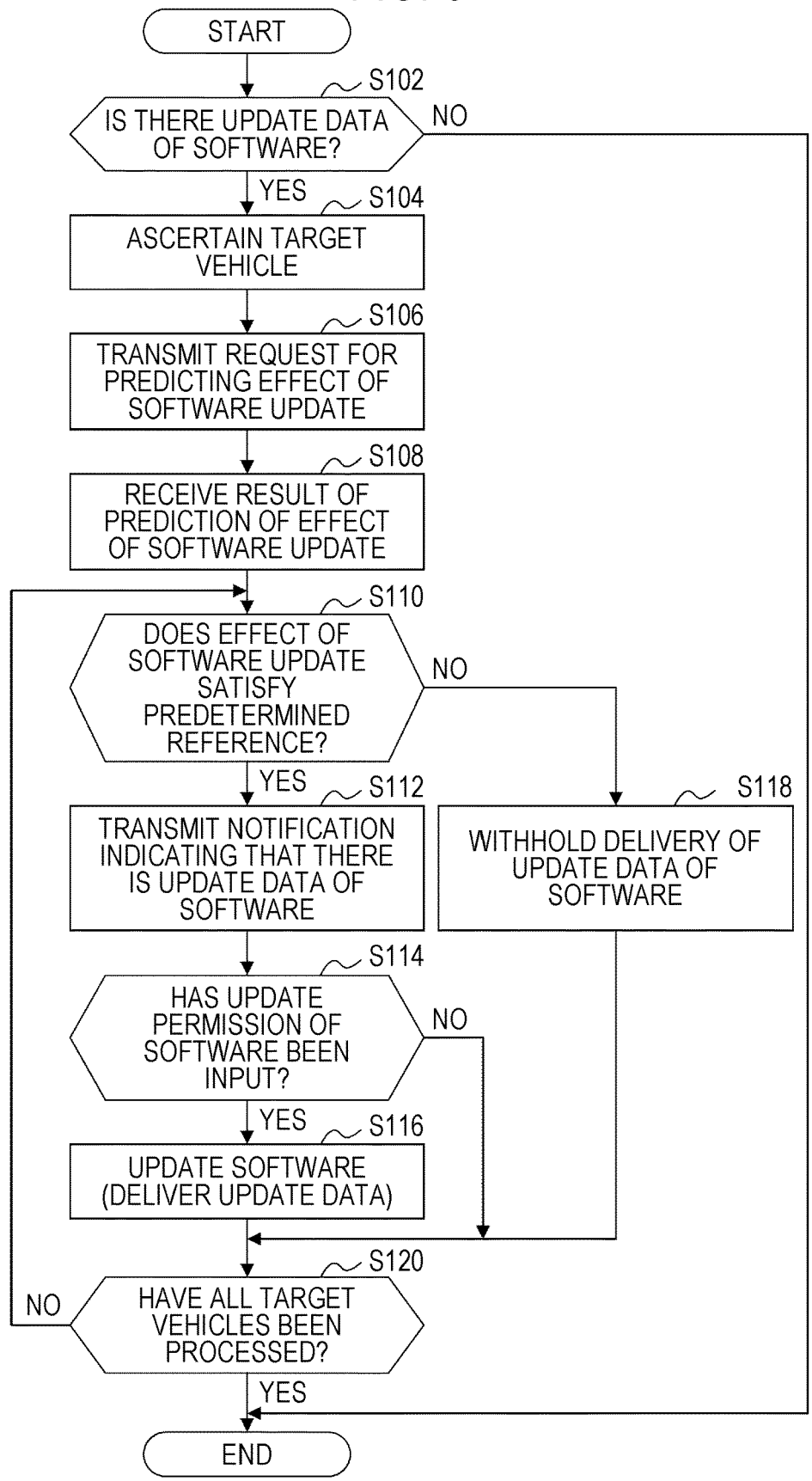
FIG. 9 is a flowchart schematically illustrating an example of a routine for software update in a vehicle which is performed by a delivery server.

FIG. 9 is a flowchart schematically illustrating an example of a software update process in a vehicle 10 which is performed by the delivery server 20. FIG. 10 is a flowchart schematically illustrating an example of a software update process in a vehicle 10 which is performed by the analysis server 30. FIG. 11 is a flowchart schematically illustrating an example of a software update process in a vehicle 10 which is performed by the central ECU 19.

A routine of the flowchart illustrated in FIG. 9 is repeatedly performed, for example, at intervals of a predetermined time. A routine of the flowchart illustrated in FIG. 10 is performed when a request for prediction of an effect of software update is received from the delivery server 20. A routine of the flowchart illustrated in FIG. 11 is performed when a notification indicating that there is update data of software is received from the delivery server 20.

The processes of Steps S110 to S118 in FIG. 9 are performed for each vehicle 10 to which update data is to be delivered.

As illustrated in FIG. 9, in Step S102, the notification unit 201 determines whether there is update data of software of the vehicle 10, specifically, whether new update data has been registered. The notification unit 201 performs the process of Step S104 when there is update data of software of the vehicle 10, and this routine of the flowchart ends when there is not update data of software of the vehicle 10.

In Step S104, the notification unit 201 ascertains the vehicle 10 to which update data is to be delivered. For example, data indicating the vehicle 10 to which update data is to be delivered is registered along with update data in the delivery server 20.

The delivery server 20 performs the process of Step S106 when the process of Step S104 is completed.

In Step S106, the notification unit 201 transmits a request for prediction of an effect of software update of the vehicle 10 to the analysis server 30. The prediction request which is transmitted includes data indicating a vehicle 10 of which an effect is to be predicted (that is, a vehicle 10 to which update data is to be delivered), details of the update data, characteristics (performance) of the vehicle of which an effect is to be predicted, and the like.

The delivery server 20 performs the process of Step S108 when the process of Step S106 is completed.

Figure 10:
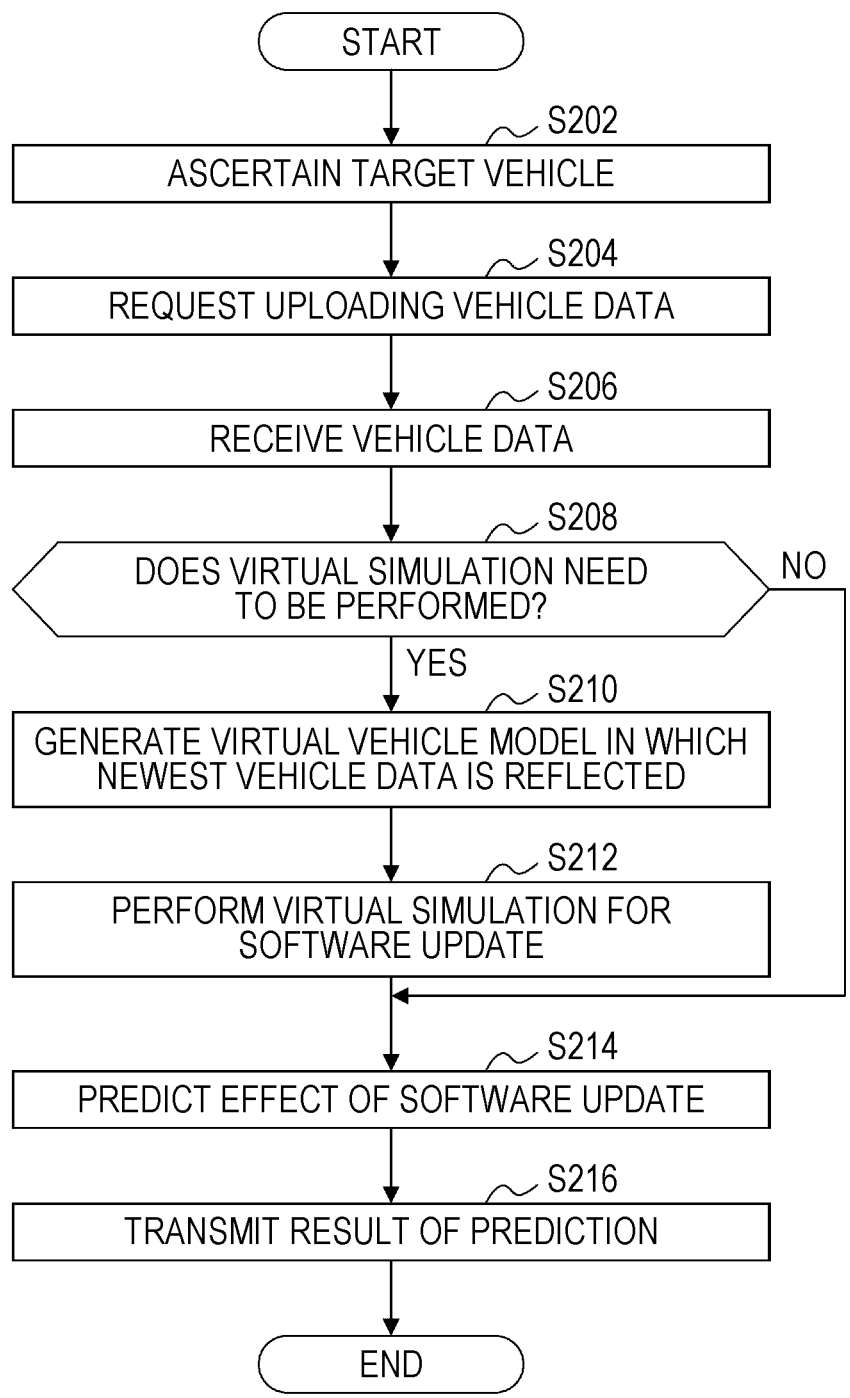
FIG. 10 is a flowchart schematically illustrating an example of a routine for software update in a vehicle which is performed by an analysis server.

When a signal including the request for prediction transmitted in the process of Step S106 is received, the analysis server 30 starts the routine of the flowchart illustrated in FIG. 10.

In Step S202, the effect predicting unit 306 ascertains the vehicle 10 of which an effect is to be predicted based on the data included in the signal including the request for prediction received from the delivery server 20.

The analysis server 30 performs the process of Step S204 when the process of Step S202 is completed.

In Step S204, the vehicle data acquiring unit 301 transmits a signal for requesting transmission of newest vehicle data to the vehicle 10 of which an effect is to be predicted. At this time, the vehicle data acquiring unit 301 may request all vehicle data which can be acquired (requested). The vehicle data acquiring unit 301 may request transmission of only some data including vehicle data required for this prediction of an effect, that is, vehicle data of a predetermined performance of the vehicle 10 which is improved by software update based on the corresponding update data.

The analysis server 30 performs the process of Step S206 when the process of Step S204 is completed.

In Step S206, the vehicle data acquiring unit 301 acquires vehicle data received from the vehicle 10 of which an effect is to be predicted and stores the acquired vehicle data in the vehicle data storage unit 302.

The analysis server 30 performs the process of Step S208 when the process of Step S206 is completed.

When vehicle data is not received from the vehicle 10 of which an effect is to be predicted even with the elapse of certain time for some reasons such as communication failure, the analysis server 30 may return to Step S204 and repeatedly perform the routine. In a case in which vehicle data is automatically uploaded from a vehicle 10 (the vehicle data acquiring unit 191) at a relatively high frequency and newest vehicle data is stored already in the vehicle data storage unit 302, the processes of Steps S204 and S206 may be skipped.

In Step S208, the effect predicting unit 306 determines whether virtual simulation needs to be performed to predict an effect of software update. The effect predicting unit 306 performs the process of Step S210 when virtual simulation needs to be performed to predict an effect of software update, and performs the process of Step S214 when virtual simulation does not need to be performed.

In Step S210, the virtual vehicle model generating unit 303 generates a virtual vehicle model in which the newest vehicle data is reflected for each vehicle 10 of which an effect is to be predicted. For example, the virtual vehicle model generating unit 303 generates a virtual vehicle model corresponding to the vehicle 10 before software update is performed by reflecting the newest vehicle data in a versatile virtual model corresponding to the vehicle 10 as described above. For example, the virtual vehicle model generating unit 303 generates a virtual vehicle model corresponding to the vehicle 10 before software update is performed by reflecting the newest vehicle data in a latest generated virtual vehicle model (for example, a digital twin) registered in the virtual vehicle model storage unit 304. The virtual vehicle model generating unit 303 generates a virtual vehicle model corresponding to the vehicle 10 after software update is performed by reflecting details of update data using the corresponding virtual vehicle model before software update is performed as a base.

The analysis server 30 performs the process of Step S212 when the process of Step S210 is completed.

In Step S212, the effect predicting unit 306 causes the simulator unit 305 to perform virtual simulation for software update for each vehicle 10 of which an effect is to be predicted. Specifically, the simulator unit 305 performs virtual simulation for the corresponding vehicle 10 after software update is performed using the corresponding virtual vehicle model after software update is performed, which is generated by the virtual vehicle model generating unit 303. The simulator unit 305 may perform virtual simulation for the corresponding vehicle 10 before software update is performed using the corresponding virtual vehicle model before software update is performed, which is generated by the virtual vehicle model generating unit 303 as described above.

The analysis server 30 performs the process of Step S214 when the process of Step S212 is completed.

In Step S214, the effect predicting unit 306 predicts an effect of software update for each vehicle 10 of which an effect is to be predicted. For example, when the routine proceeds from Step S208 to Step S214, the effect predicting unit 306 predicts an effect of update software to be updated based on details of software update and a history of vehicle data of the vehicle 10 in which software update is to be performed as described above (for example, see FIGS. 5 and 6). For example, when the routine proceeds from Step S212 to Step S214, the effect predicting unit 306 predicts an effect of software update by comparing data of the results of virtual simulation corresponding to the newest vehicle data and the vehicle data of the vehicle 10 after software update is performed as described above. The effect predicting unit 306 may predict an effect of software update by comparing the results of virtual simulation corresponding to the vehicle 10 before and after software update is performed as described above.

The analysis server 30 performs the process of Step S216 when the process of Step S214 is completed.

In Step S216, the effect predicting unit 306 transmits a result of prediction of an effect of software update of the vehicle 10 to which update data is to be delivered to the delivery server 20.

The analysis server 30 ends this routine of the flowchart when the process of Step S216 is completed.

Referring back to FIG. 9, in Step S108, the notification unit 201 acquires the result of prediction of an effect of software update of the vehicle 10 which is received from the analysis server 30.

The analysis server 30 performs the process of Step S110 when the process of Step S108 is completed.

When a result of prediction of an effect of software update of the vehicle 10 is not received from the analysis server 30 even with the elapse of certain time for some reasons such as communication failure, the delivery server 20 may return to Step S106 and repeatedly perform the routine.

In Step S110, the notification unit 201 determines whether the effect of software update of the corresponding vehicle 10 satisfies a predetermined reference based on the result of prediction acquired from the analysis server 30. For example, when the effect predicting unit 306 predicts whether there is an effect of software update of the vehicle 10 as described above and the result of prediction indicates that there is an effect, it is determined that the effect satisfies the predetermined reference. For example, when the effect predicting unit 306 predicts a degree of effect of software update of the vehicle 10 and the degree of effect is equal to or greater than a predetermined reference or exceeds the predetermined reference as described above, it is determined that the effect satisfies the predetermined reference. The notification unit 201 performs the process of Step S112 when the effect of software update of the corresponding vehicle 10 satisfies the predetermined reference, and performs the process of Step S118 when the effect of software update does not satisfy the predetermined reference.

In Step S112, the notification unit 201 transmits a notification indicating that there is update data of software to the vehicle 10.

The delivery server 20 performs the process of Step S114 when the process of Step S112 is completed.

In Step S112, the notification unit 201 may transmit a signal of the notification to the user terminal 40 of the user of the vehicle 10 instead of or in addition to the vehicle 10 as described above.

Figure 11:
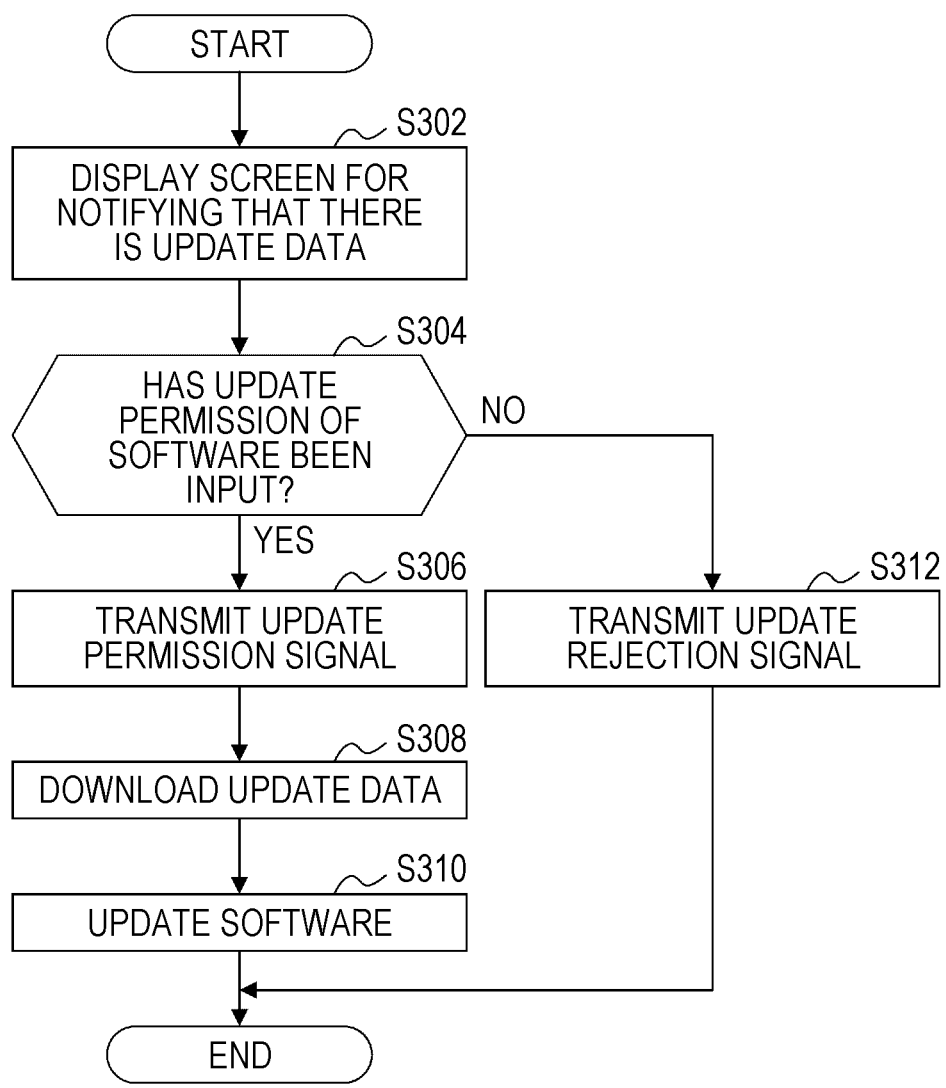
FIG. 11 is a flowchart schematically illustrating an example of a routine for software update in a vehicle which is performed by a central ECU.

The central ECU 19 of the vehicle 10 starts the routine of the flowchart illustrated in FIG. 11 when the signal transmitted in the process of Step S112 is received.

In Step S302, the download processing unit 192 causes the display device 18 to display a notification screen for notifying that there is update data of software. Accordingly, the user of the vehicle 10 can ascertain that there is update data of software and determine whether to perform software update.

The central ECU 19 performs the process of Step S304 when the process of Step S302 is completed and an input indicating whether to perform software update is received via the input device 17.

In Step S304, the download processing unit 192 determines whether an input for permitting software update has been received. The download processing unit 192 performs the process of Step S306 when an input for permitting software update has been received, and performs the process of Step S312 when an input for permitting software update has not been received, that is, when an input for rejecting software update has been received.

In Step S306, the download processing unit 192 transmits a signal indicating that software update is permitted (hereinafter referred to as an "update permission signal") to the delivery server 20 via the gateway ECU 12 (the communication device 11).

The central ECU 19 performs the process of Step S308 when the process of Step S306 is completed.

As illustrated in FIG. 9, in Step S114, the notification unit 201 determines whether an input for permitting software update has been received in the vehicle 10. Specifically, the notification unit 201 determines whether the update permission signal has been received from the vehicle 10 to which update data is to be delivered. The notification unit 201 performs the process of Step S116 when the update permission signal has been received from the vehicle 10.

In Step S116, the delivery unit 202 delivers update data to the vehicle 10 and causes the vehicle 10 (the central ECU 19) to perform software update.

The delivery server 20 performs the process of Step S120 when the process of Step S116 is completed.

As illustrated in FIG. 11, in Step S308, the download processing unit 192 downloads update data delivered from the delivery server 20 via the gateway ECU 12 (the communication device 11).

The central ECU 19 performs the process of Step S310 when the process of Step S308 is completed.

In Step S310, the software updating unit 194 performs software update using the update data downloaded to the storage unit 193 in accordance with a software update command received from the delivery server 20.

The software updating unit 194 may perform software update based on its own determination when the update data has been completely downloaded from the delivery server 20.

The central ECU 19 ends this routine of the flowchart when the process of Step S310 is completed.

On the other hand, in Step S312, the download processing unit 192 transmits a signal indicating that software update is rejected (hereinafter referred to as an "update rejection signal") to the delivery server 20 via the gateway ECU 12 (the communication device 11).

The central ECU 19 ends this routine of the flowchart when the process of Step S312 is completed.

When a signal for notifying that there is update data is transmitted from the delivery server 20 to the user terminal 40 as described above, the same routine as in the flowchart illustrated in FIG. 10 except for the processes of Steps S308 and S310 is performed by the user terminal 40 (the notification unit 401). When an update permission signal is transmitted from the user terminal 40 to the delivery server 20, the central ECU 19 performs only the processes of Steps S308 and S310 in the flowchart illustrated in FIG. 11 in accordance with a command from the delivery server 20.

As illustrated in FIG. 9, in Step S114, the notification unit 201 performs the process of Step S120 when an update permission signal has not been received from the vehicle 10, that is, when an update rejection signal has been received from the vehicle 10.

On the other hand, in Step S118, the delivery unit 202 determines that delivery of update data of software is withheld. Accordingly, the delivery server 20 can curb software update of which an effect is relatively low as described above, and thus it is possible to more appropriately update software used in the vehicle 10. At this time, the delivery unit 202 may record data indicating that delivery of the corresponding update data has been withheld for a specific vehicle 10 (for example, a flag) or the like in a predetermined storage area of the auxiliary storage device 22 of the delivery server 20. Accordingly, the delivery server 20 can ascertain that the corresponding update data has been withheld for the specific vehicle 10 later and thus curb occurrence of a situation in which the corresponding update data is erroneously transmitted to the specific vehicle 10.

The delivery server 20 performs the process of Step S120 when the process of Step S118 is completed.

In Step S120, the delivery server 20 determines whether the processes of Steps S110 to S118 have been completed for all the vehicles 10 to which update data is to be delivered. When the processes have not been completed for all the vehicles 10 to which update data is to be delivered, the delivery server 20 returns to Step S110 and performs the processes of Steps S110 to S118 on a vehicle 10 on which the processes have not been completely performed out of the vehicles 10 to which update data is to be delivered. On the other hand, the delivery server 20 ends this routine of the flowchart when the processes have been completely performed on all the vehicles 10 to which update data is to be delivered.

Before a user is requested to determine whether software update is permitted, the update data may be delivered to the vehicle 10. In this case, the delivery server 20 performs a process of delivering update data of software to the corresponding vehicle 10 instead of performing the process of Step S112 and transmits a signal of a command to perform software update to the corresponding vehicle 10 in Step S116. In this case, the central ECU 19 starts the routine of the flowchart illustrated in FIG. 11 when the update data of software has been completely downloaded, and performs a process of receiving a signal of a command to perform software update from the delivery server 20 instead of performing the process of Step S308. In this case, when the central ECU 19 determines whether to perform software update by itself, the processes of Steps S306 and S308 in FIG. 11 are skipped.

In this way, in this example, the software update system 1 can more appropriately update software used in a vehicle 10 by withholding transmission of update data to the corresponding vehicle 10 when the effect of software update does not satisfy a predetermined reference.

Operations

The operations of the software update system 1 according to this embodiment will be described below.

In this embodiment, the software update system 1 includes the vehicle data acquiring unit 301, the effect predicting unit 306, and the delivery unit 202. Specifically, the vehicle data acquiring unit 301 is configured to acquire data of a vehicle 10 including data of a predetermined performance of the vehicle 10. The effect predicting unit 306 is configured to predict an effect on the predetermined performance which is obtained when update data of software used in the vehicle 10 for improvement of the predetermined performance is applied to the vehicle 10 based on the data acquired by the vehicle data acquiring unit 301. The delivery unit 202 is configured to deliver the update data to the vehicle 10 when the effect predicted by the effect predicting unit 306 satisfies a predetermined reference and to withhold delivery of the update data to the vehicle 10 when the effect predicted by the effect predicting unit 306 does not satisfy the predetermined reference.

With this configuration, the software update system 1 can curb occurrence of a situation in which software update with a relatively low effect is uselessly performed in the corresponding vehicle 10. Accordingly, the software update system 1 can more appropriately update software which is used in the vehicle 10.

In this embodiment, the software update system 1 may further include the virtual vehicle model generating unit 303. Specifically, the virtual vehicle model generating unit 303 may be configured to generate a virtual vehicle model corresponding to the vehicle 10 based on the data acquired by the vehicle data acquiring unit 301. The effect predicting unit 306 may be configured to predict the effect which is obtained when the update data is applied to the vehicle 10 by performing virtual simulation using the virtual vehicle model generated by the virtual vehicle model generating unit 303.

With this configuration, the software update system 1 can specifically predict the effect which is obtained by software update.

In this embodiment, the effect predicting unit 306 may be configured to predict the effect by comparing newest data of the vehicle 10 about the predetermined performance acquired by the vehicle data acquiring unit 301 with data acquired through virtual simulation based on the virtual vehicle model corresponding to the vehicle 10 after software update has been performed based on the update data.

With this configuration, the software update system 1 can more simply predict the effect of software update using existing (newest) vehicle data acquired by the vehicle data acquiring unit 301.

In this embodiment, the effect predicting unit 306 may be configured to predict the effect by comparing data acquired through virtual simulation based on the virtual vehicle models corresponding to the vehicle 10 before and after software update has been performed based on the update data.

With this configuration, the software update system 1 can more accurately predict the effect of software update of the vehicle 10.

In this embodiment, the effect predicting unit 306 may be configured to determine whether the virtual simulation is to be performed at the time of prediction of the effect according to details of update of the software based on the update data.

With this configuration, for example, the software update system 1 can achieve balance between simplification of a process for predicting the effect of software update and improvement in prediction accuracy of the effect of software update and thus achieve improvement in efficiency of the processes.

In this embodiment, the effect predicting unit 306 may be configured to change traveling conditions of the vehicle 10 at the time of performing the virtual simulation according to details of software update based on the update data.

With this configuration, the software update system 1 can perform virtual simulation for the vehicle 10 according to traveling conditions which are affected by software update of the vehicle 10. Accordingly, the software update system 1 can more accurately predict the effect of software update of the vehicle 10.

In this embodiment, the vehicle data acquiring unit 301 may be configured to acquire newest data of the vehicle. The virtual vehicle model generating unit 303 may be configured to generate the virtual vehicle model by reflecting vehicle data acquired by the vehicle data acquiring unit 301 in a versatile model corresponding to the vehicle 10.

With this configuration, the software update system 1 can predict the effect of software update, for example, using a virtual model (a versatile model) which is common to a plurality of vehicles 10 of the same vehicle model. Accordingly, for example, the software update system 1 can reduce labor or time required for preparation of a virtual vehicle model for evaluating the effect of software update and more efficiently predict the effect of software update.

In this embodiment, the vehicle data acquiring unit 301 may be configured to repeatedly acquire data on a state of the vehicle 10 with the elapse of time. The virtual vehicle model generating unit 303 may be configured to perform generation and update of the virtual vehicle model with acquisition of the data on the state of the vehicle 10 by the vehicle data acquiring unit 301.

With this configuration, the software update system 1 can generate a virtual vehicle model suitable for circumstances specific to each vehicle 10 such as a use state of the vehicle 10. Accordingly, the software update system 1 can more accurately predict the effect of software update of the vehicle 10.

In this embodiment, the virtual vehicle model generating unit 303 may be configured to generate the virtual vehicle model in which manufacturing irregularities of the vehicle 10 is reflected based on the vehicle data acquired by the vehicle data acquiring unit 301.

With this configuration, the software update system 1 can reflect the manufacturing irregularities of the vehicle 10 which is circumstances specific to the vehicle 10 in the virtual vehicle model.

In this embodiment, the virtual vehicle model generating unit 303 may be configured to generate the virtual vehicle model in which at least one of aging variation of the vehicle 10, operating conditions of the vehicle 10, and change in elements of the vehicle 10 is reflected based on the data acquired by the vehicle data acquiring unit 301.

With this configuration, the software update system 1 can reflect aging variation of the vehicle 10, operating conditions of the vehicle 10, change in elements of the vehicle 10, and the like which are circumstances specific to the vehicle 10 in the virtual vehicle model.

In this embodiment, the virtual vehicle model may be a digital twin corresponding to the vehicle 10.

With this configuration, the software update system 1 can predict the effect of software update using the virtual vehicle model (the digital twin) in which the newest state of the vehicle 10 is normally reflected. Accordingly, the software update system 1 can more accurately predict the effect of software update of the vehicle 10.

In this embodiment, the effect predicting unit 306 may be configured to predict the effect in consideration of a period in which a user uses the vehicle 10 in the future.

With this configuration, the software update system 1 can predict the effect of software update of the vehicle 10 in consideration of the circumstances specific to the user.

While an embodiment has been described above in detail, the present disclosure is not limited to such a specific embodiment, but can be modified or improved in various forms without departing from the gist of the appended claims.

What is claimed is:

1. An information processing system comprising:
one or more processors configured to acquire data of a vehicle including data of a predetermined performance of the vehicle;
predict an effect on the predetermined performance which is obtained when update data of software used in the vehicle for improvement of the predetermined performance is applied to the vehicle based on the acquired data;
deliver the update data to the vehicle when the predicted effect satisfies a predetermined reference and to withhold delivery of the update data to the vehicle when the predicted effect does not satisfy the predetermined reference;
and generate a virtual model corresponding to the vehicle based on the acquired data, wherein the circuitry is configured to predict the effect by performing virtual simulation using the virtual model,
wherein the one or more processors are configured to repeatedly acquire data on a state of the vehicle with an elapse of time,
wherein the one or more processors are configured to perform generation and update of the virtual model with acquisition of the data on the state of the vehicle, and
wherein the one or more processors are configured to generate the virtual model in which manufacturing irregularities of the vehicle are reflected based on the acquired data.

2. The information processing system according to claim 1, wherein the one or more processors are configured to predict the effect by comparing newest data of the vehicle regarding the predetermined performance with data acquired through virtual simulation based on the virtual model corresponding to the vehicle after the software has been updated based on the update data.

3. The information processing system according to claim 1, wherein the one or more processors are configured to predict the effect by comparing data acquired through virtual simulation based on the virtual models corresponding to the vehicle before and after the software has been updated based on the update data.

4. The information processing system according to claim 1, wherein the one or more processors are configured to determine whether the virtual simulation is to be performed at a time of prediction of the effect according to details of update of the software based on the update data.

5. The information processing system according to claim 1, wherein the one or more processors are configured to change traveling conditions of the vehicle at a time of performing the virtual simulation according to details of update of the software based on the update data.

6. The information processing system according to claim 1, wherein the one or more processors are configured to acquire newest data of the vehicle, and generate the virtual model by reflecting acquired data in a versatile model corresponding to the vehicle.

7. The information processing system according to claim 1, wherein the one or more processors are configured to generate the virtual model in which at least one of aging variation of the vehicle, operating conditions of the vehicle, and change in elements of the vehicle is reflected based on the acquired data.

8. The information processing system according to claim 1, wherein the virtual model is a digital twin corresponding to the vehicle.

9. The information processing system according to claim 1, wherein the one or more processors are configured to predict the effect in consideration of a period in which a user uses the vehicle in the future.

10. An information processing method that is performed by an information processing device, the information processing method comprising:
- an acquisition step of acquiring data of a vehicle including data of a predetermined performance of the vehicle;
- a prediction step of predicting an effect on the predetermined performance which is obtained when update data of software used in the vehicle for improvement of the predetermined performance is applied to the vehicle based on the data acquired in the acquisition step;
- a delivery step of delivering the update data to the vehicle when the effect predicted in the prediction step satisfies a predetermined reference and withholding delivery of the update data to the vehicle when the effect predicted in the prediction step does not satisfy the predetermined reference; and
- a generation step of generating a virtual model corresponding to the vehicle based on the data acquired in the acquisition step,
- wherein the prediction step predicts the effect by performing virtual simulation using the virtual model,
- wherein the acquisition step repeatedly acquires data on a state of the vehicle with an elapse of time,
- wherein the generation step performs generation and update of the virtual model with acquisition of the data on the state of the vehicle in the acquisition step, and
- wherein the generation step generates the virtual model in which manufacturing irregularities of the vehicle are reflected based on the data acquired in the acquisition step.

11. A non-transitory storage medium storing a program causing an information processing device to perform:
- an acquisition step of acquiring data of a vehicle including data of a predetermined performance of the vehicle;
- a prediction step of predicting an effect on the predetermined performance which is obtained when update data of software used in the vehicle for improvement of the predetermined performance is applied to the vehicle based on the data acquired in the acquisition step;
- a delivery step of delivering the update data to the vehicle when the effect predicted in the prediction step satisfies a predetermined reference and withholding delivery of the update data to the vehicle when the effect predicted in the prediction step does not satisfy the predetermined reference; and
- a generation step of generating a virtual model corresponding to the vehicle based on the data acquired in the acquisition step,
- wherein the prediction step predicts the effect by performing virtual simulation using the virtual model,
- wherein the acquisition step repeatedly acquires data on a state of the vehicle with an elapse of time,
- wherein the generation step performs generation and update of the virtual model with acquisition of the data on the state of the vehicle in the acquisition step, and
- wherein the generation step generates the virtual model in which manufacturing irregularities of the vehicle are reflected based on the data acquired in the acquisition step.

* * * * *